US012747967B2

(12) United States Patent
Andrews et al.

(10) Patent No.: US 12,747,967 B2
(45) Date of Patent: Sep. 29, 2026

(54) SYSTEM AND METHOD FOR FLEXIBLE MULTI-VARIABLE SENSOR

(71) Applicant: Wisconsin Alumni Research Foundation, Madison, WI (US)

(72) Inventors: Joseph Andrews, Madison, WI (US); Maimaitiaizezi Tuxunniyazi, Madison, WI (US); Brian Cardwell, Northville, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 345 days.

(21) Appl. No.: 18/510,980

(22) Filed: Nov. 16, 2023

(65) Prior Publication Data

US 2024/0167857 A1 May 23, 2024

Related U.S. Application Data

(60) Provisional application No. 63/427,473, filed on Nov. 23, 2022.

(51) Int. Cl.

*G01L 7/16* (2006.01)
*G01D 21/02* (2006.01)
(Continued)

(52) U.S. Cl.

CPC ............... *G01D 21/02* (2013.01); *G01K 7/16* (2013.01); *G01L 7/08* (2013.01); *G01L 9/0051* (2013.01)

(58) Field of Classification Search

CPC .......... G01D 21/02; G01K 7/16; G01K 13/02; G01L 7/08; G01L 9/0051; G01L 1/2287

See application file for complete search history.

(56) References Cited

U.S. PATENT DOCUMENTS 5,321,983 A * 6/1994 Nagata ...................... G01P 5/10 73/204.26
8,943,888 B2 * 2/2015 Huang .................. G01F 1/6888 73/204.24

(Continued)

FOREIGN PATENT DOCUMENTS

| | | |
|---|---|---|
| JP | 11-271120 | 10/1999 |
| JP | 2016-197076 | 11/2016 |
| KR | 10-2020-0114363 | 10/2020 |

OTHER PUBLICATIONS

International Search Report and Written Opinion for Application No. PCT/US2023/080553 dated Mar. 12, 2024 (10 pages).

(Continued)

*Primary Examiner* — Freddie Kirkland, III
(74) *Attorney, Agent, or Firm* — Boyle Fredrickson, S.C.

(57) ABSTRACT

A multi-variable sensor includes a first trace that is configured to measure a first variable and a second trace that is configured to measure a second variable that is different from the first variable. The first trace extends from a first end at a first terminal to a second end at a second terminal and the second trace extends from a third end at the second terminal to a fourth end at a third terminal. The first trace has a first sensitivity to the first variable and the second trace has a second sensitivity to the first variable that is less than the first sensitivity. The second trace has a third sensitivity to the second variable and the first trace has a fourth sensitivity to the second variable that is less than the third sensitivity.

24 Claims, 17 Drawing Sheets

(51) Int. Cl.

| | |
|---|---|
| ***G01K 7/16*** | (2006.01) |
| ***G01L 7/08*** | (2006.01) |
| ***G01L 9/00*** | (2006.01) |

(56) References Cited

U.S. PATENT DOCUMENTS

| | | | | |
|---|---|---|---|---|
| 10,043,605 | B2 * | 8/2018 | Ng | G01L 1/2287 |
| 10,288,498 | B2 * | 5/2019 | Taguchi | G01L 1/2243 |
| 10,627,946 | B2 * | 4/2020 | Bian | G06F 3/041 |
| 10,703,924 | B2 * | 7/2020 | Walker | H05K 1/097 |
| 11,073,415 | B2 * | 7/2021 | Udrea | G01N 25/18 |
| 11,255,740 | B2 * | 2/2022 | Chau | G01L 9/0052 |
| 12,007,262 | B2 * | 6/2024 | Udrea | G01F 1/6888 |
| 2002/0100316 | A1 * | 8/2002 | James | G01F 1/6845 73/204.26 |
| 2007/0011867 | A1 * | 1/2007 | Yao | G01F 1/6845 29/611 |
| 2007/0017285 | A1 * | 1/2007 | Wang | G01F 1/68 73/204.26 |
| 2010/0280788 | A1 * | 11/2010 | Bohan | G01K 7/42 374/107 |
| 2011/0030468 | A1 * | 2/2011 | Chen | G01F 1/6845 73/204.26 |
| 2014/0190251 | A1 * | 7/2014 | Huang | G01F 1/692 73/204.24 |
| 2018/0024014 | A1 * | 1/2018 | Taguchi | G01L 1/18 73/862.628 |
| 2018/0143051 | A1 * | 5/2018 | Bentley | G01F 1/69 |
| 2019/0301909 | A1 * | 10/2019 | Nakano | G01F 1/6842 |
| 2023/0366757 | A1 * | 11/2023 | Huang | G01K 7/16 |

OTHER PUBLICATIONS

International Report on Patentabilty for Application No. PCT/US2023/080553 dated May 27, 2025 (7 pages).

* cited by examiner

| INK | Ag NP INK (mL) | Ni–Cu NP INK (mL) | TERPINEOL (mL) |
|---|---|---|---|
| INK 1 | 2 | 0 | 0.2 |
| INK 2 | 1.8 | 0.2 | 0.2 |
| INK 3 | 1.6 | 0.4 | 0.2 |
| INK 4 | 1.4 | 0.6 | 0.2 |
| INK 5 | 1.2 | 0.8 | 0.2 |

| ELEMENT | EXTRACTED SPECTRUM | |
|---|---|---|
| Δ | WEIGHT % | ATOM % |
| Ag L | 100.00 | 100.00 |
| Ag M | — | — |
| | 100.00 | 100.00 |

| ELEMENT | EXTRACTED SPECTRUM | |
|---|---|---|
| ▷ | WEIGHT % | ATOM % |
| Ag L | 98.82 | 97.94 |
| Cu K | 0.66 | 1.12 |
| Ni K | 0.52 | 0.94 |
| Ni L | —— | —— |
| Cu L | —— | —— |
| Ag M | —— | —— |
| | 100.00 | 100.00 |

| ELEMENT | EXTRACTED SPECTRUM | |
|---|---|---|
| ▷ | WEIGHT % | ATOM % |
| Ag L | 97.54 | 95.74 |
| Cu K | 1.29 | 2.14 |
| Ni K | 1.17 | 2.12 |
| Ni L | —— | —— |
| Cu L | —— | —— |
| Ag M | —— | —— |
| | 100.00 | 100.00 |

| ELEMENT | EXTRACTED SPECTRUM | |
|---|---|---|
| ▷ | WEIGHT % | ATOM % |
| Ag L | 95.59 | 92.53 |
| Cu K | 2.72 | 4.47 |
| Ni K | 1.69 | 3.00 |
| Ni L | — | — |
| Cu L | — | — |
| Ag M | — | — |
| | 100.00 | 100.00 |

| ELEMENT | EXTRACTED SPECTRUM | |
|---|---|---|
| ▷ | WEIGHT % | ATOM % |
| Ag L | 92.09 | 86.96 |
| Cu K | 5.24 | 8.39 |
| Ni K | 2.68 | 4.64 |
| Ni L | —— | —— |
| Cu L | —— | —— |
| Ag M | —— | —— |
| | 100.00 | 100.00 |

SYSTEM AND METHOD FOR FLEXIBLE MULTI-VARIABLE SENSOR

CROSS-REFERENCE TO RELATED APPLICATIONS

This application claims benefit from U.S. Provisional Application Ser. No. 63/427,473, filed Nov. 23, 2022, the entirety of which is incorporated herein.

STATEMENT REGARDING FEDERALLY SPONSORED RESEARCH

N/A

FIELD OF THE INVENTION

The present disclosure relates to sensor technology, and more specifically, sensor arrangements for measuring multiple variables.

BACKGROUND AND SUMMARY OF THE DISCLOSURE

Embodiments of the disclosed subject matter can allow for measuring multiple variables using a single sensor (e.g., a multi-variable printed sensor). For example, a sensor according to the disclosure can generally include a first trace configured to measure a first variable (e.g., a mechanically-induced strain), a second trace configured to measure a second variable (e.g., a temperature), and so on. The traces of a sensor can form a single continuous electrical path through which an electrical current can flow, with appropriate contacts to allow measurement (e.g., of changes in electrical resistance along particular parts of the continuous path).

Accordingly, each trace can be specifically configured to enhance sensitivity to the measured variable, or to decrease cross sensitivity to a non-measured variable (e.g., a variable being measured by another trace of the sensor). For example, particular parts of an electrical path of a multi-variable sensor can be arranged in a particular shape or can use a particular material composition that can cause differing relative sensitivities to the measured variables within each trace. As a result, a first trace can have a first sensitivity to a first variable to be measured by the first trace and the second trace can have a second sensitivity to the first variable that is less than the first sensitivity. Conversely, the second trace can have a third sensitivity to a second variable to be measured by the second trace and the first trace can have a fourth sensitivity to the second variable that is less than the third sensitivity.

According to an aspect of the present disclosure, a multi-variable sensor can include a first trace and a second trace. The first trace can extend from a first end at a first terminal to a second end at a second terminal and the second trace can extend from a third end at the second terminal to a fourth end at a third terminal. The first trace can have a first sensitivity to a first variable of a measured system and the first and second terminals can provide contacts to measure the first variable using the first trace. The second trace can have a second sensitivity to the first variable that is less than the first sensitivity and the second and third terminals can provide contacts to measure a second variable of the measured system using the second trace. The second variable can be different from the first variable.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of non-limiting examples of the disclosure and are not intended to limit the scope of the disclosure or exclude alternative implementations.

DETAILED DESCRIPTION

Figure 1A:
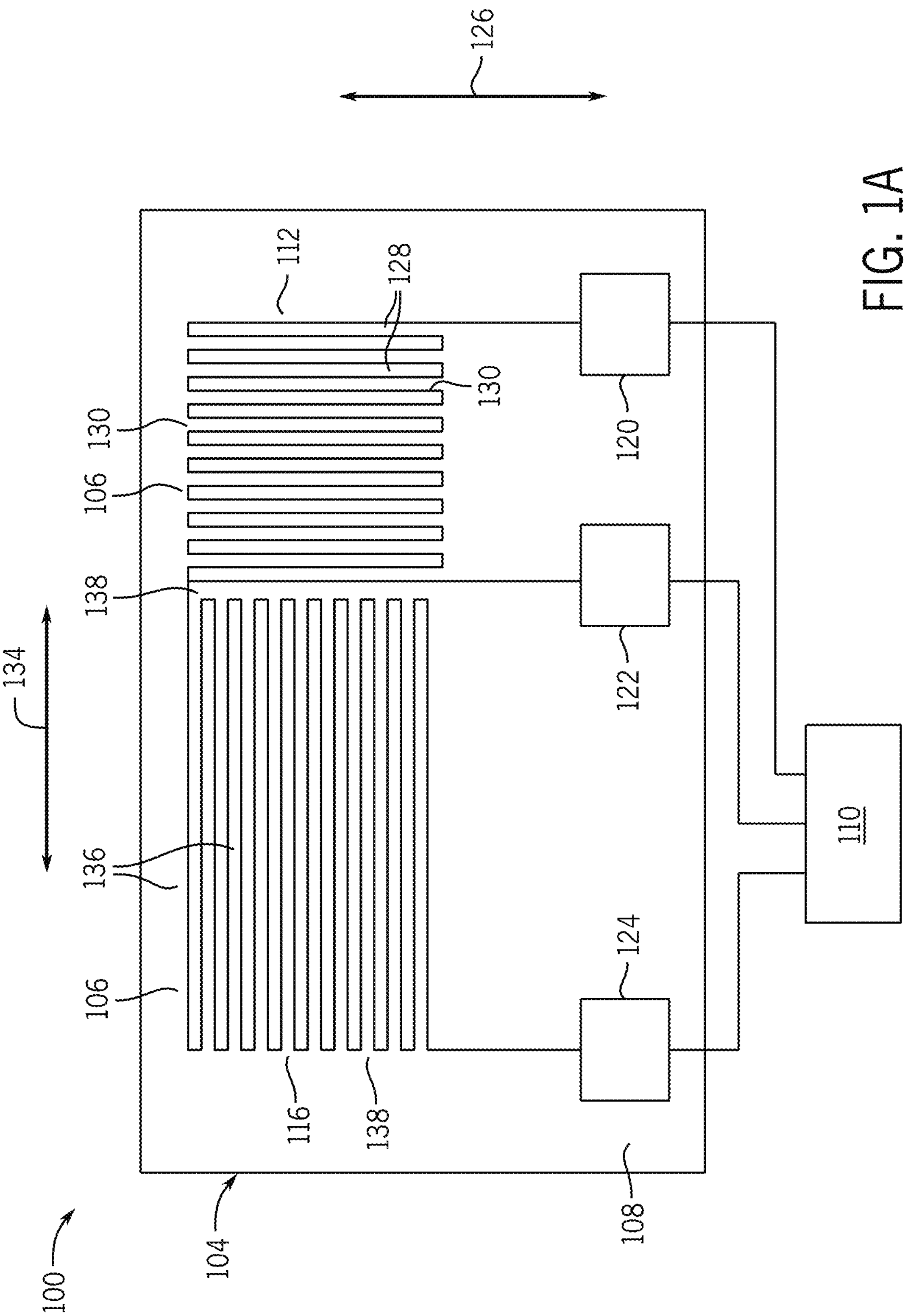
FIG. 1A is a schematic view of a first configuration of a sensor according to aspects of the disclosure.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

Unless otherwise specified or limited, the terms "about" and "approximately," as used herein with respect to a reference value, refer to variations from the reference value of ±20% or less (e.g., ±15, ±10%, ±5%, etc.), inclusive of the endpoints of the range.

Also as used herein, unless otherwise limited or defined, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a power machine, as defined relative to a horizontal support surface on which the power machine is operationally situated), with a similarly derived meaning also for "substantially horizontal." A path that is not linear is substantially parallel to a reference direction if a straight line between end-points of the path is substantially parallel to the reference direction or a mean derivative (i.e., mean local slope) of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees or ±3 degrees), inclusive. For a path that is not linear, the path can be considered to be substantially perpendicular to a reference direction if a straight line between end-points of the path is substantially perpendicular to the reference direction or a mean derivative (i.e., mean local slope) of the path within a common reference frame as the reference direction is substantially perpendicular to the reference direction.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As briefly noted above, sensors can be used to measure variables (i.e., operational parameters) of a system, for example, pressure, strain, temperature, or flow rate, etc. Typically, a sensor is configured to measure a single type of variable, and as a result, multiple types of sensors may be required in order to measure a corresponding number of variables. The use of multiple sensors to measure multiple variables may result in increased cost and complexity.

Described herein are systems and methods for measuring multiple variables using a single sensor. More specifically a multi-variable sensor for a sensor system according to the disclosure can be configured as a flexible sensor having two or more electrically-conductive traces, which can be supported on a flexible or other substrate (e.g., an elastomeric substrate). The traces can be configured as thin film resistors that can be formed by printing one or more electrically conductive inks onto the flexible substrate. Accordingly, the traces can bend or flex with the flexible substrate to cause a change in an electrical property of each trace (e.g., an electrical resistance value). This change in electrical property can then be correlated with the specific variable being measured by each trace.

Correspondingly, each of multiple traces on a sensor can define an electrically conductive path between a first end and a second end. An electrical contact (i.e., a terminal) can be provided at each end of the trace to allow for measurement of the electrical property across the trace. For example, where an electrically property is an electrical resistance, a resistance measurement device (e.g., an ohmmeter, multimeter, etc.) can coupled to the first and second ends of the trace to monitor a change in the electrical resistance.

The individual traces can be electrically coupled with one another, so as to collectively form single electrically conductive path. For example, a first trace may extend from a first end at a first terminal to a second end at a second terminal. A second trace may then extend from a third end at the second terminal to a fourth end at a third terminal. In other words, the second terminal can be a common terminal to the two traces. Accordingly, a first electrical property of the first trace can be measured across the first and second terminals, and a second electrical property of the second trace can be measured across the second terminal and the third terminal. The first electrical property can be correlated to a first variable (e.g., strain, pressure, flow rate, etc.) and the second electrical property can be correlated to a second variable (e.g., temperature). Because the traces share the second terminal, the number of connections to a measurement device can be reduced, as compared with conventional sensor systems that use one sensor per measured variable and therefore require two (or more) connections per measured variable.

Where multiple traces are connected with one another, each trace may be specifically configured to measure a particular variable, for example, by increasing sensitivity to the variable being measured or by reducing sensitivity to one or more variables that are not being measured (e.g., reducing cross-sensitivity to another variable being measured by another trace of the sensor). For example, for a flexible sensor having two traces, a first trace can be tuned to increase sensitivity to a first variable being measured or to decrease sensitivity to a second variable being measured. Conversely, a second trace can be tuned to increase sensitivity to the second variable being measured or to decrease sensitivity the first variable being measured. Nonetheless, some effects of each of two measured variables may be seen in both of two traces, and known signal processing techniques can be applied in some cases to deconvolute these mixed effects and thereby better isolate a particular target variable for a particular trace.

Generally, as used herein, "sensitivity" refers to the degree of change to the resistance or another relevant property of a particular trace in response to a particular change in a relevant variable. For example, if a first trace has higher sensitivity to temperature than does a second trace, the resistance of the first trace generally changes by a relatively larger amount than the resistance of the second trace in response to the same change in temperature, as can be expressed by a higher TCR (as further discussed below). As another example, if a first trace has higher sensitivity to strain than does a second trace, the resistance of the first trace generally changes by a relatively larger amount than the resistance of the second trace in response to the same strain. Sensitivity for a particular trace can depend on various factors, including the material of the trace itself, the characteristics of a substrate of the trace (as applicable), the geometry of the trace pattern, etc.

In some examples, the orientation or shape of the trace can increase or decrease sensitivity to a variable, for example by increasing or decreasing sensitivity to a particular strain (e.g., a type or direction of strain). Accordingly, a first trace for measuring a first variable (e.g., a mechanically-induced strain) can have a first pattern configuration and a second trace for measuring a second variable (e.g., a temperature) can have a second pattern configuration that is different from the first pattern configuration. Correspondingly, in some cases, a first trace pattern can be configured to increase relative sensitivity to the first variable (e.g., strain) as compared to the second variable (e.g., temperature) and a second trace pattern can be configured to increase relative sensitivity to the second variable as compared to the first variable.

In some examples, a first trace can be configured as a meander with a plurality of primary first trace lines that are connected by secondary first trace lines to form a single continuous path. The primary first trace lines can be a plurality of parallel and linear trace lines that are oriented to extend in a first direction and the secondary first trace lines can be oriented to extend in a second direction transverse (e.g., substantially perpendicularly) to the first direction. Similarly, a second trace can also be configured as a meander with a plurality of a primary second trace lines that connected by secondary second trace lines to form a single continuous path. The primary second trace lines can be a plurality of parallel and linear trace lines that are oriented to extend in the second (or another) direction and the secondary second trace lines can be oriented transverse (e.g., substantially perpendicularly) to the second direction (e.g., to extend in the first direction).

In some examples, the first trace pattern can be configured to increase sensitivity to a first variable (e.g., a strain oriented along a first direction) and the second trace pattern can be configured to reduce sensitivity to the first variable so that the second trace pattern has a lower relative sensitivity to the first variable. For example, the first and second traces can generally be configured as meanders with primary traces lines that are connected by secondary trace lines to form a single continuous path. The primary first trace lines can be configured as parallel and linear traces lines that extend in the first direction to increase sensitivity to a strain oriented along the first direction. Conversely, the primary second trace lines can extend in the first direction, but can be configured as having a serpentine shape, thereby increasing a total length of the trace that does extend along the first direction and reducing sensitivity to the strain along the first direction.

In some examples, each trace of a plurality of traces on a sensor be printed onto a substrate using an electrically conductive ink that is configured to increase or decrease sensitivity to a variable, for example, by increasing or decreasing sensitivity to a particular variable (e.g., a type or direction of strain). Accordingly, a first trace can be formed from a first ink and a second trace can be formed from a second ink that is different from the first ink. In some cases, a first ink can be configured to increase sensitivity to a first variable (e.g., a mechanically-induced strain, including bending, stretching, or compression), as compared with a second ink that can be configured to increase sensitivity to a second variable (e.g., a temperature-induced strain), or to have reduced cross sensitivity to the first variable.

For example, a first ink that is configured to measure a first variable and a second ink that is configured to measure a second variable can both include electrically conductive particles (e.g., silver nanoparticles) that can allow electrical current to flow along the traces. The first ink can include electrically conductive particles at a first percent weight concentration and the second ink can include electrically conductive particles at a second percent weight concentration, which can be greater than first percent weight concentration and result in greater sensitivity to the first variable in the first trace. In particular, the second percent weight concentration can be approximately 30% weight and the first percent weight concentration can be approximately 4% weight, so that the ratio of the second percent weight concentration to the fist percent weight concentration is approximately 10:1. Depending on the type of electrically conductive particles, ink additives, or variables being measured, other ratios are also possible (e.g., 2:1, 5:1, 15:1, 20:1, etc.). Correspondingly, the magnitude of each percent weight concentration can be selected to achieve a particular ratio.

In general, electrically conductive inks typically also include various organic binders that can be adjusted to increase or decrease sensitivity to a particular variable being measured. In particular, where a first ink is configured to measure a first variable (e.g., strain due to bending or stretching) and a second ink is configured to measure a second variable (e.g., temperature), an amount (e.g., a percentage weight concentration) of organic binders in the second ink can be reduced, as compared with the first ink. Such a relative reduction can, for example, increase sensitivity to the second variable at the second trace.

Moreover, additives can be included in one of the inks to reduce cross-sensitivity. For example, a first ink can be a hybrid ink that can include multiple types of conductive particles, including, for example, silver particles and one or more types of secondary conductive particles (e.g., transition metals, for example, nickel or copper), while a second ink may only include a single type of conductive particle, for example, silver. The inclusion of the secondary conductive particles can reduce TCR of the first ink, thereby reducing the effects of temperature on the measured strain. Accordingly, where the first trace is configured to measure a strain (e.g., associated with bending) and the second trace is configured to measure temperature, the inclusion of the secondary conductive particles can reduce cross-sensitivity to temperature in the first trace. As discussed herein, inks without secondary conductive particles includes inks with zero alloying metals and inks with negligible amounts of secondary conductive particles (i.e., as may change a TCR by no more than 10% from a baseline reference with zero secondary conductive particles).

FIG. 1A illustrates a multi-variable sensor system 100 according to aspects of the disclosure. In general, the sensor system 100 can include one or more multi-variable sensors, each of which can be configured to measure two or more variables of a system being monitored. For example, as described herein, the sensor system 100 can be used to monitor two or more variables of a flow system (not shown), in particular, a flow rate and a temperature of the flow system. However, sensor systems according to the disclosure are not to be limited to the specific applications described herein and may also be used to measure other types of variables or other types of systems.

With continued reference to FIG. 1A, the sensor system 100 include a multi-variable sensor 104 that is configured to measure two variables, namely, a physical deformation due to bending, which can be correlated with a flow rate of the flow system, and a temperature, which can also be correlated to (e.g., closely match) a temperature (e.g., fluid temperature) of the flow system. In general, the sensor 104 can be configured flexible sensor that includes a plurality of traces 106 that are supported on a flexible substrate 108 (e.g., an elastomeric or other flexible material). More specifically, in some cases, the traces 106 can be thin film traces that are formed by aerosol or ink-jet printing one or more electrically conductive inks onto the substrate 108; however, other methods of depositing or otherwise securing the traces 106 onto the substrate 108 can also be used. In some cases, a protective coating or film (not shown) can be placed over the traces 106 to help improve the lifespan of the sensor 104, for example, by reducing corrosion of the traces 106.

In general, a trace 106 can define a single electrically conductive path that, when deformed, can cause a change in an electrical property of the trace 106. This change in electrical property can be measured using a measurement device 110 (e.g., a multimeter, voltmeter, ammeter, ohmmeter, etc.) that is electrically coupled with the trace 106. For example, as illustrated, the traces 106 are configured as thin film resistors that experience a measurable change in an electrical resistance, which can be measured by the measurement device 110. This change in electrical resistance can then be correlated with a measured variable. Accordingly, in some cases, the sensor system 100 can include a processor or other computing device (not shown) that can be configured to calculate the strain or variable from the measured electrical property of the trace 106.

In general, each trace of sensor can be configured to measure a particular variable of the flow system. Accordingly, as shown in FIG. 1A, the sensor 104 includes a first trace 112 that is configured to measure a strain and a second trace 116 that is configured to measure a temperature. The first strain can be associated with a mechanical deformation of the sensor 104 (e.g., a mechanically-induced strain caused by bending, stretching, or compression), which can be associated with a flow rate of the flow system.

As illustrated, the first trace 112 and the second trace 116 can be arranged in series with one another to define a single electrical path across both traces, through which an electrical current can flow. This configuration may allow for a reduced number of connections to the measurement device 110, as compared with conventional sensors that generally require two terminals per trace (or variable to be measured). More specifically, the first trace 112 can extend from a first end at a first terminal 120 to a second end at second terminal 122 and the second trace 116 can extend from a third end at the second terminal 122 to a fourth end at a third terminal 124. A first resistance of the first trace 112, and thus a strain associated with a flow rate, can be measured between the first terminal 120 and the second terminal 122. Similarly, a second resistance of the second trace 116, and thus a temperature, can be measured between the second terminal 122 and the third terminal 124. Where additional traces are included, they can be arranged in series in a similar manner.

Traces of a multi-variable sensor as disclosed (e.g., traces 112, 116) are generally coupled in series, and thus in electrical communication with one another. Accordingly, it can be beneficial that the traces be configured differently from one another to improve the ability of the sensor overall to accurately measure multiple variables. For example, a trace can be configured to particularly sensitive to a variable being measured by that trace or to reduce cross sensitivity to a different variable that is not being measured by that trace. As described in greater detail below, this increase in sensitivity or decrease in cross-sensitivity can be accomplished in a number of ways, which can be used in combination or in isolation from one another.

In some cases, the pattern (i.e., shape) of a trace can be selected to increase or decrease sensitivity to a strain that is oriented along a particular direction. For example, as shown in FIG. 1A, the first trace 112 can be configured as a meander that is arranged to increase sensitivity to a strain that is oriented along a first direction 126 (e.g., a direction of the strain to be measured). More specifically, the first trace 112 can include a plurality of a primary first trace lines 128 that are connected by secondary first trace lines 130 to form a single continuous path between the first terminal 120 and the second terminal 122.

The primary first trace lines 128 are configured as substantially parallel lines that are oriented along the first direction 126 and the secondary first trace lines 130 are configured as substantially parallel lines that are oriented substantially perpendicularly to the first direction 126. Because the primary first trace lines 128 are longer than the secondary first trace lines 130, a greatest portion of the total length of the first trace 112 is aligned along the first direction. Accordingly, a strain acting along the first direction 126 can cause a greater change in resistance of the first trace 112 than would a strain acting in another direction, thereby increasing sensitivity to the desired strain or source of strain, and thus the desired variable (e.g., flow rate).

Similarly, the second trace 116 is also configured as a meander that is arranged to increase sensitivity to a strain that is oriented along a second direction 134, or a non-directional variable, for example, temperature (e.g., by reducing sensitivity to the strain measured by the first trace 112). Here, there second direction 134 is shown being substantially perpendicular to the first direction 126, so as to minimize the change in resistance caused by strains acting along the first direction 126. As a result, any change in resistance may be caused primarily by temperature. In other examples, the second direction 134 may be oriented differently relative to the first direction 126. Likewise, other orientations of the traces 114, 116 relative to each other on the sensor 104 are also possible.

In any case, the second trace 116 can include a plurality of a primary second trace lines 136 that are connected by secondary second trace lines 138 to form a single continuous path between the second terminal 122 and the third terminal 124. However, the primary second trace lines 136 are configured as substantially parallel lines that are oriented along the second direction 134 and the secondary second trace lines 138 are configured as substantially parallel lines that are oriented substantially perpendicularly to the second direction 134 (i.e., along the first direction 126).

Figure 1B:
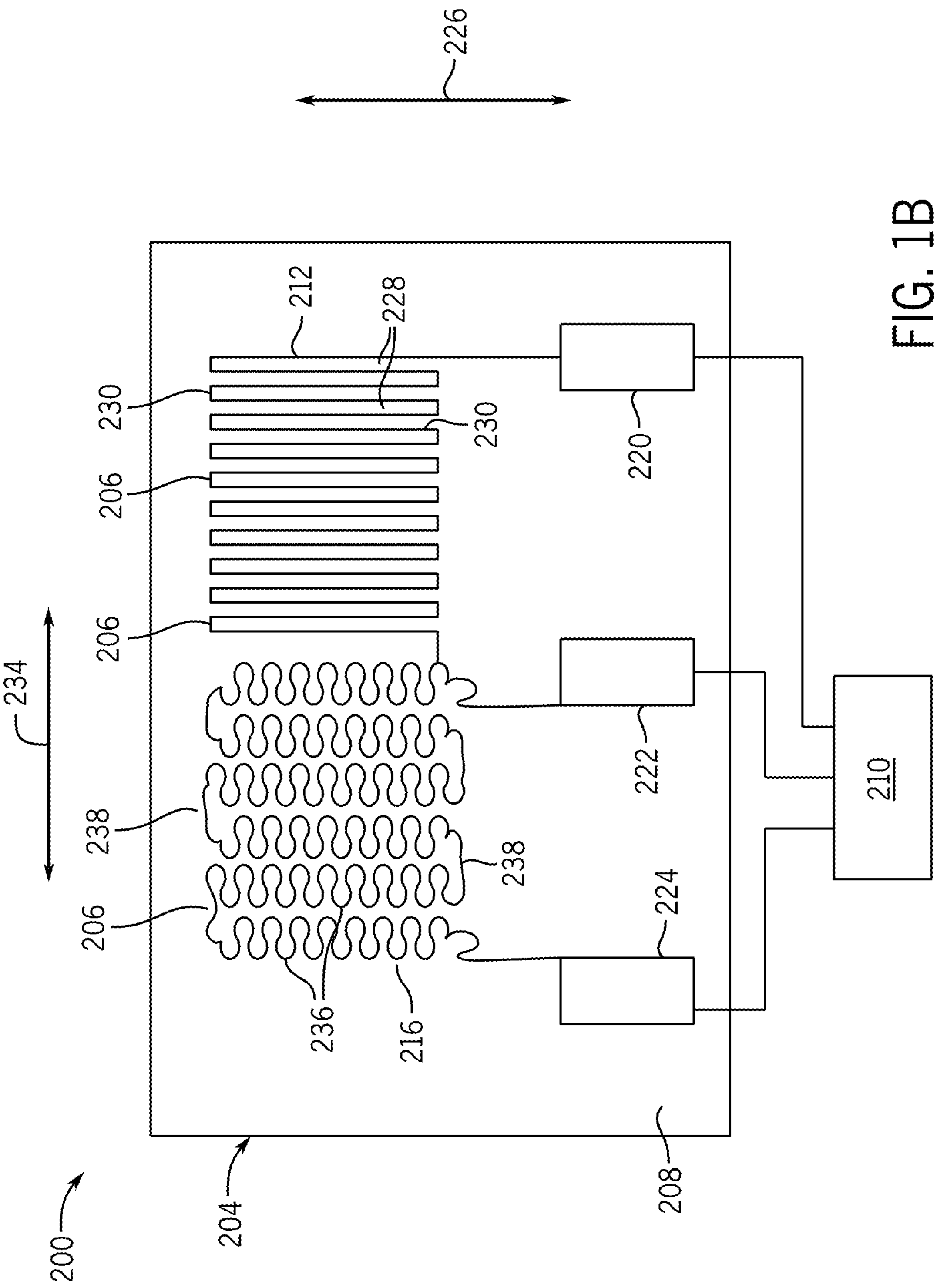
FIG. 1B is a schematic view of another configuration of a sensor according to aspects of the disclosure.

Although the trace patterns illustrated in FIG. 1A can be particularly beneficial in some cases, a variety of other trace patterns can also be used to achieve useful measurement of multiple variables. For example, FIG. 1B shows another configuration of a sensor system 200 that is generally similar to the configuration of the sensor system 100, with like features indicated by like reference numerals. In particular, the sensor system includes multi-variable sensor 204 that include a plurality of traces 206, namely a first trace 212 and a second trace 216 that are supported on a substrate 208. Like with the previously described sensor system 100, the first trace extends between a first terminal 220 and a second terminal 222 and the second trace extends between the second terminal 222 and a third terminal 224. A measurement device 210 can be coupled to the terminals 220, 222, 224 to measure an electrical property of each of the first trace 212 and the second trace 216.

As shown in FIG. 1B, although the first traces 112, 212 are generally similar, the second trace 216 is configured differently from the second trace 116. Specifically, while the second trace 216 remains configured as a meander, the second trace 216 includes primary second trace lines 236 are that are oriented along a first direction 226 and secondary second trace lines 238 that are oriented substantially perpendicularly to the first direction 226, similar to the primary first trace lines 228 and secondary first trace lines 232 of the first trace 212, respectively. Additionally, rather than being parallel lines, the primary second trace lines 236 are non-linear and have a serpentine configuration of repeating s-shapes. This arrangement increases the total proportion of second trace 216 that is oriented along the first direction 226, so as to minimize the effect of strain along that direction (e.g., to reduce sensitivity to the strain being measured by the first trace 212).

Figures 2, 3:
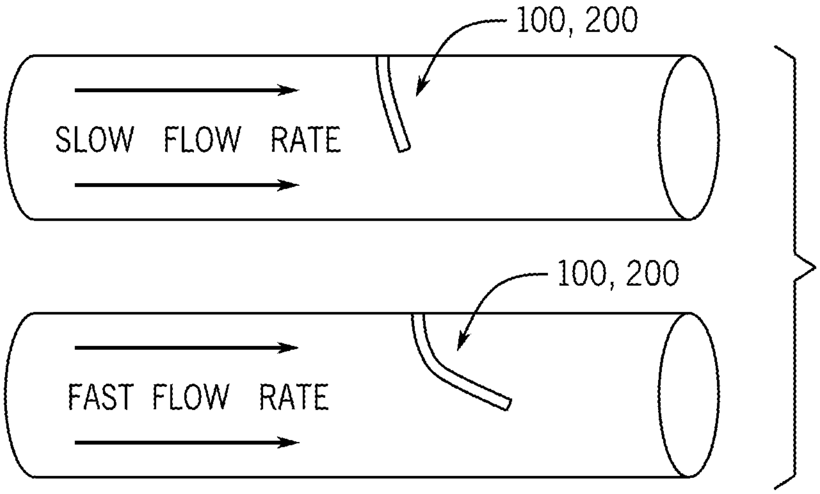
FIG. 2 shows schematic views of an example installation of a sensor configured as in FIG. 1A or 1B.
FIG. 3 is a table showing various hybrid ink compositions according to aspects of the disclosure

As one example application, single sensors with differently oriented traces as generally discussed herein can be used to measure multiple variables regarding a fluid flow. In some examples, such a sensor can also provide improved sensitivity as compared to known sensors. For example, some configurations can be used as in-flow sensors (e.g., rather than wrapping around an outside of a flow conduit) and thus provide improved sensitivity to various flow variables (e.g., flow rate and temperature). In this regard, FIG. 2 illustrates an example sensor installation in which either of the sensor systems 100, 200 can be arranged within a flow conduit to measure characteristics of a flow therein. In a particular example, in this regard, a first trace (e.g., the first traces 112, 212) can be oriented to primarily sense strain in response to movement of the sensor by the fluid flow and a second trace (e.g., the second traces 116, 216) can be oriented to primarily sense temperature changes of the fluid. Thus, for example, a single sensor can provide high quality and inexpensive direct sensing of fluid characteristics. In the illustrated example, the sensor is installed as a flexible flap (or flag) that extends into the fluid flow, so that the fluid flow causes forces on the flexible flap which causes the displacement thereof and the sensor is in close proximity to the flow to measure a temperature thereof. In other examples, however, other arrangements are possible, including for measurement of multiple flow characteristics.

In some cases, a composition of an ink use to form a trace of a sensor can be adjusted to increase sensitivity to a variable or to decrease cross sensitivity to other variables. For example, a first trace (e.g., the first trace 112 or the first trace 212) can be printed using a first ink having a first composition and a second trace (e.g., the second trace 116 or the second trace 216) can be printed using a second ink having a second composition that is different from the first composition.

In general, inks for printing traces onto a substrate can include electrically conductive particles (e.g., metallic particles) that are suspended in solution with a variety of organic binders and solvents, which allows the ink to be sprayed onto a substrate in the pattern of the trace (e.g., using inkjet or aerosol jet printing techniques). For example, some inks can utilize metallic nanoparticles, for example, silver nanoparticles, which can be dispersed in xylene or another solvent along with various other additives and adhesion promotors (i.e., binders). Silver nanoparticle inks may be particularly useful due to their relatively low temperature processability, wide commercial availability, and good electrical conductivity after sintering. Additionally, the electrical conductivity of silver nanoparticle inks is sensitive to both mechanically-induced strains and temperature, which can allow the ink to be used in multi-variable sensing applications, such as those described above with respect to sensor 100 and sensor 200. Although silver based inks may be notably useful for these types of applications, other ink compositions using other types of conductive particles can also be used (e.g., with other metal particles as the primary conductive material).

Continuing, in some cases, a percent weight concentration of a conductive particles can be selected to tune a trace's sensitivity to a particular variable (e.g., a primary source of a measured strain). For example, a first trace (e.g., the first trace 112 or 212) configured for measuring a strain associated primarily with a flow rate (or other movement-induced strain) can be formed from a first ink having a first percent weight concentration of conductive particles. Correspondingly, a second trace (e.g., the second trace 116 or 216) configured for measuring a temperature (or a different source of strain) can be formed from a second ink having a second percent weight concentration of conductive particles, which can be different from the first percent weight concentration.

As one particular example, where the first and second inks utilize silver nanoparticles as conductive particles, the first ink can have a first percent weight concentration of silver nanoparticles that is less than a second percent weight concentration of silver nanoparticles of the second ink. The lower concentration in silver nanoparticles in the first ink can increase sensitivity to mechanically-induced strains, such as those associated with a flow rate, while causing a comparatively minimal change in sensitivity to temperature. For example, lower concentrations of the silver nanoparticles can result in larger interstitial spacing between the conductive particles in a trace, with corresponding potentially large increases in resistance as strain increases.

In some cases, the different percent weight concentrations of the first and second inks can be achieved by diluting a base ink with additional solvent. For example, the second ink can be formed from a base ink with a percent weight concentration of silver nanoparticles that can be between approximately 40% and approximately 45%. Accordingly, the second percent weight concentration of the second ink can be between approximately 40% and approximately 45%. The first ink can then be formed by diluting the base ink with additional solvent to reduce the percent weight concentration of the base ink to be at the desired first percent weight concentration of the first ink. In some cases, the first percent weight concentration can be between approximately 4% and approximately 4.5%, so that the ratio of the second percent weight concentration to the first percent weight concentration is approximately 10:1. Depending on, the particular ink composition being used or variables being measured, the percentage weight concentrations can be selected differently, for example to have different magnitudes (e.g., 65% and 6.5%, 30% and 3%, etc.), or to achieve a different ratio of the percent weight concentrations (e.g., 2:1, 5:1, 20:1, etc.).

Correspondingly, the increase in sensitivity to mechanically-induced strains can be caused by the greater dispersion of the silver nanoparticles in the first ink, which can reduce the percolation conductivity the particles. Additionally, dilution of the first ink can result in a comparatively thinner ink, which may be less resilient to extreme deformations (e.g., bending due to flow forces or pressure acting on the sensor). That is, under deformation, it is possible that cracks (i.e., discontinuities) may develop with the first ink, further reducing the number of electrical connections between particles, and causing a greater rate of increase in electrical resistance. Accordingly, the first ink can be diluted, including as can permit cracking within the structure of the first ink to achieve the desired increase in sensitivity. Further, this cracking can be achieved without compromising the mechanical stability of the trace, as the underlying substrate can be comparatively thicker and can provide support to the trace. In some cases, as also generally discussed above, an ink can be diluted to 5-10% by weight (or lower) of a relevant conductive material (e.g., silver nanoparticles).

As another example, higher purity inks—those with less additives or binders for a given percent weight concentration of conductive particles—can also be used to increase sensitivity to a particular variable. The reduction in additives and binders can have a similar, but opposite effect to diluting an ink, as described above, in that it can increase the number of electrical connections between conductive particles. This reduction in additives or binders can result in increased sensitivity to temperature, while causing a comparatively minimal change in sensitivity to mechanically-induced strains Accordingly, in keeping with the example above, where the first and second inks utilizes silver nanoparticles, the first ink can have a higher concentration of additives or binders as compared with the second ink, as can increase sensitivity to temperature in the second trace.

As yet another example, it is also possible to utilize hybrid inks that can contain various secondary conductive particles (e.g., transition metal nanoparticles) in addition to the primary conductive particles. The particular secondary conductive particles can be selected based on their compatibility with the ink solvent, type of primary conductive particles, and method of printing being used, as may allow for high-throughput processing. For example, in the case of the silver nanoparticle ink described above, which uses xylene as a solvent, copper and nickel nanoparticles can be added to the ink to form a hybrid nickel-copper-silver nanoparticle ink.

In general, the hybridization of an ink can reduce the TCR of the ink, which is a measure of a material's relative change of electrical resistance per degree of temperature change. By reducing the TCR through the introduction of these varied particles and the corresponding incorporation of interfacial obstacles within the structure of the corresponding trace, the overall sensitivity of the printed sensors can be selectively enhanced (or reduced). In other words, use of hybridized ink can be used to fine-tune temperature sensitivity in particular traces. Accordingly, in some examples (e.g., continuing with the example above), the first ink can be a hybrid nickel-copper-silver nanoparticle ink and the second ink can be a silver nanoparticle ink that is not hybridized, so that the conductive particles therein consist only of a single conductive material (e.g., silver nanoparticles). As a result, the first and second inks can have different temperature coefficients of resistance, and the differing temperature coefficients of resistance for the first and second inks can help to reduce cross-sensitivity to temperature.

Experimental Results

Experiments were performed to investigate increasing the overall sensitivity of a trace (defined as the change in resistance per change in temperature) through the use of a hybridized silver nanoparticle ink while maintaining compatibility with the aerosol jet printing technique. To accomplish this, hybrid inks were used, which contained secondary conductive particles in the form of other (i.e., non-silver) transition metal nanoparticles due to their compatibility with the solvent vehicle and printing method, allowing for high throughput processibility.

Transitional metal nanomaterials, including nickel (Ni) and copper (Cu) nanoparticles, were used as secondary conductive particles due to their solution processibility and high sintering temperature around 900° C. The high sintering temperature helped to ensure that the nickel and copper did not contribute to the conductive percolation network of a homogenous silver nanoparticle thin film, given that the sensor was not subjected to temperatures above 400° C. Additionally, nickel nanoparticles have the added benefit of being corrosion resistant, which can aid in effective passivation within the thin-film, reducing the impact of humidity.

These experiments demonstrate an easy way to develop hybrid conductive inks with tunable TCR and sensitivity for printed resistive temperature sensors by aerosol jet printing hybrid conductive inks composed of Ag, Cu, and Ni nanoparticles. First, the morphological and elemental differences in printed thin films containing various volume fractions of two commercially available inks were studied; one with silver nanoparticles only and one with a mixture of Ni and Cu nanoparticles. Next, the resistance dependence on temperature was characterized and used to calculate the TCR and the overall sensitivity. Ultimately, the results showed that it is possible to tune TCR value from $1.04\times10^{-3}$ (° C.−1) to $2.35\times10^{-3}$ (° C.−1) and the sensitivity of the printed temperature sensors from 0.15 (Ω/° C.) to 0.59 (Ω/° C.) solely by adjusting the composition the hybrid conductive ink.

The silver nanoparticle inks used in this study was UTDAg25TE, produced by UT Dots Incorporated. This formulation include of silver nanoparticles dispersed in xylene with proprietary additives and adhesion promoters. The percent weight concentration of the Ag is 45%. The Ni—Cu nanoparticle ink was Ni-UA70T from Nanomagic Incorporated. Their formulation is also in xylene and the particle loading of this ink is 25%. The inks were printed on Kapton® film with a thickness of approximately 125 μm and diluted with Terpineol.

To produce the ink samples, silver nanoparticle ink and Ni—Cu nanoparticle ink were mixed in a vial with different volume percent as shown in FIG. 3. 0.2 mL of Terpineol was added to adjust ink viscosity. The mixed inks were ultrasonicated for 1 hour using a Branson bath sonicator to ensure proper mixing of the hybrid inks. Then 2 ml of hybrid ink is transferred to the ink vial of the aerosol jet printer.

Figure 4:
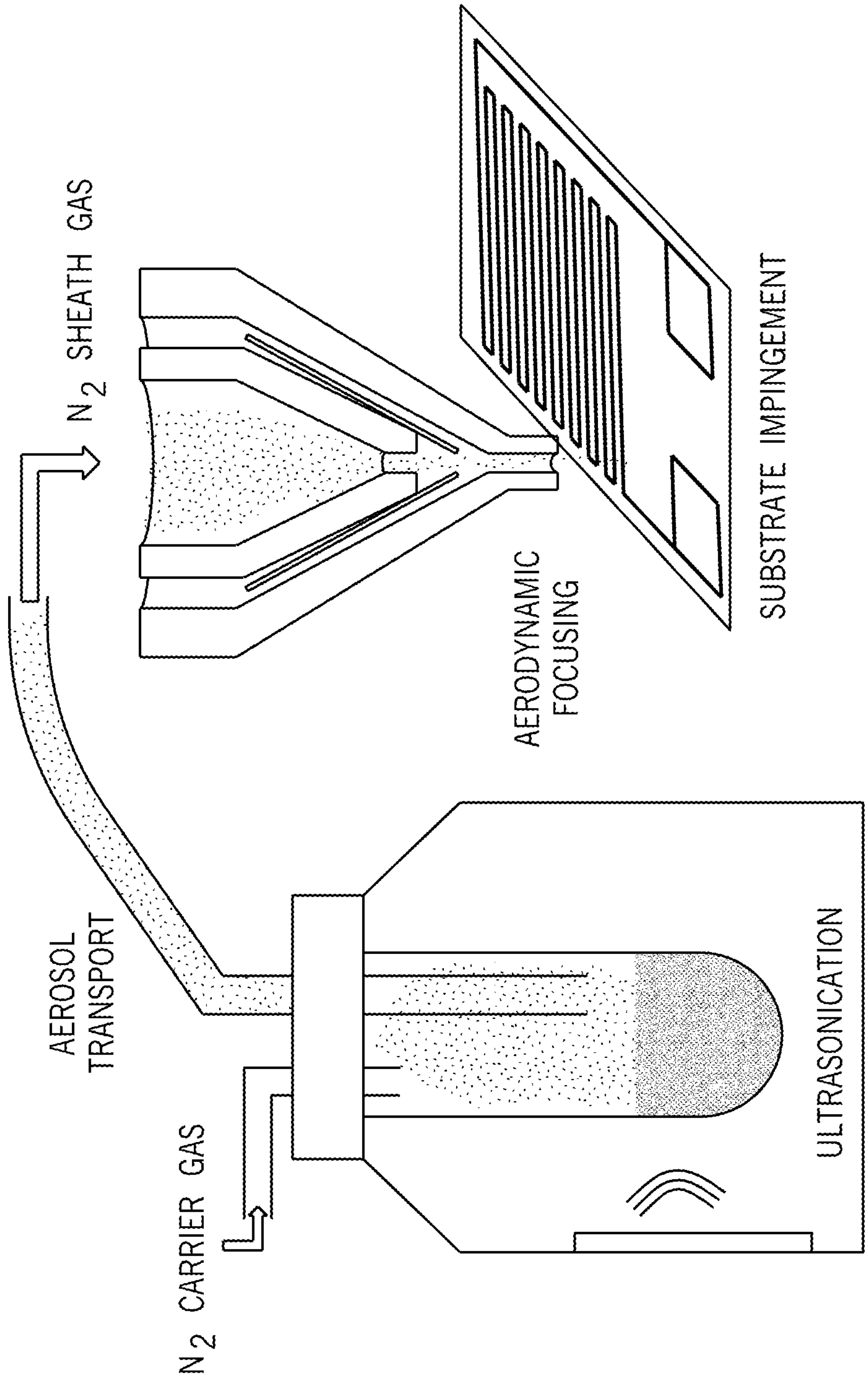
FIG. 4 is a schematic view of an aerosol jet printing process according to aspects of the disclosure.
Figure 5:
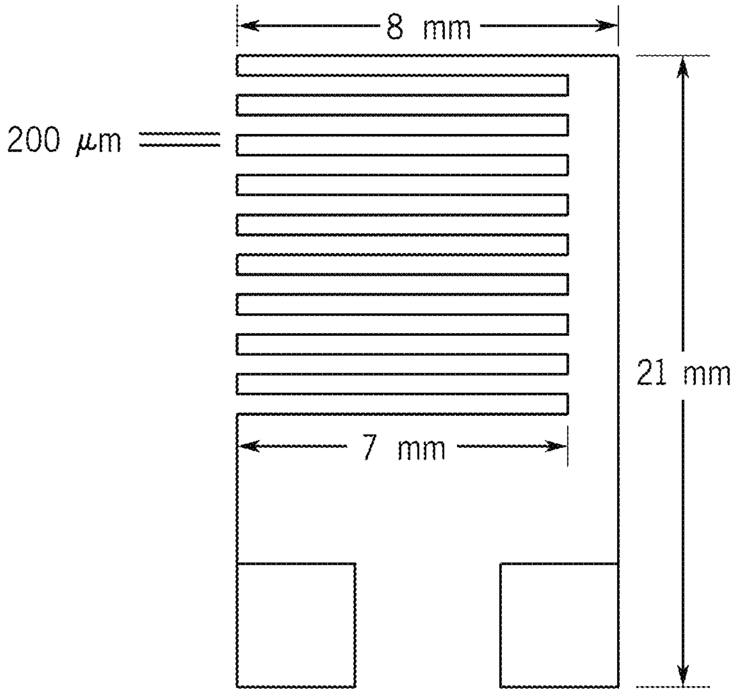
FIG. 5 is a schematic view of a trace printed using the aerosol jet printing process of FIG. 4.

In the experiment, all the sensors were printed using the aerosol jet printing technique and trace design shown in FIGS. 4 and 5. Aerosol jet printing of AgNP/Ni—Cu hybrid ink was carried out using an Optomec AJ200 aerosol jet printer with ultrasonic atomizer and a 200 μm nozzle was used for all the printings for this work. The sheath flow rate, and carrier gas flow rate were slightly adjusted for each ink composition and kept between 25-40 SCCM and 18-25 SCCM, respectively. The atomizer current was set to 0.5 Amps and the platen temperature was set to 70° C., with a printing speed of 6 mm/s. Before printing, the Kapton substrate was cleaned with deionized water and IPA to remove dusts and contaminants. One pass of AgNP/Ni—Cu NP hybrid ink was printed in a meandered shape to be used as resistive temperature sensor.

In the print process, the hybrid ink was aerosolized by ultrasonic agitation and taken to the nozzle via nitrogen carrier gas. The sonication excites the liquid ink into an aerosol of droplets on the order of 1 μm to 5 μm in diameter. Next, the ink is taken to the nozzle using an inert carrier gas, where it is subsequently focused using a secondary sheath gas. The droplet laden convergent gas flow is accelerated at the nozzle tip, resulting in a high-speed flow that allows for transport to the substrate at a standoff distance of 4 mm. As mentioned above, printing parameters such as carrier gas flow rate and sheath gas flow rate were fine-tuned carefully to ensure print quality, with each different ink requiring slightly different parameters to achieve the same line resolution, which was approximately 75 μm.

Figure 6:
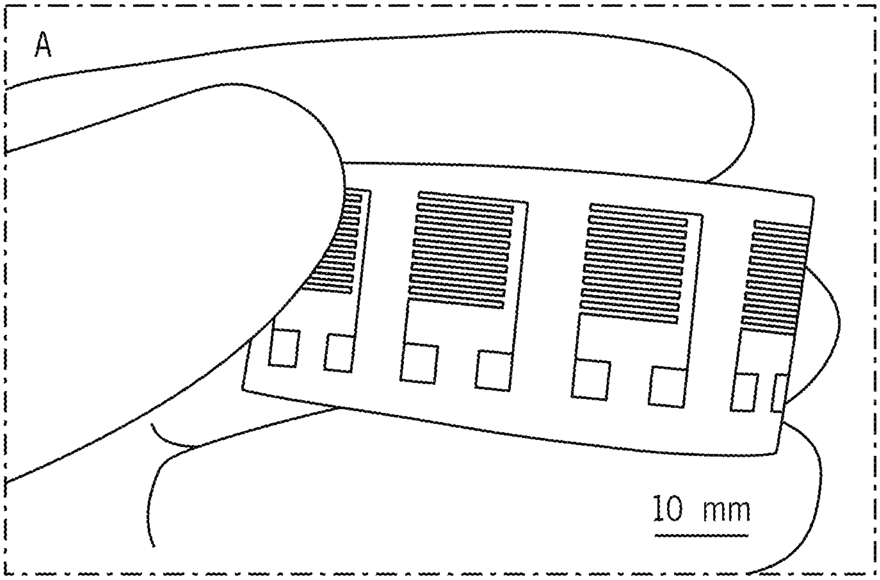
FIG. 6 is an image of an array of traces printed using the aerosol jet printing process of FIG. 4.
Figure 7:
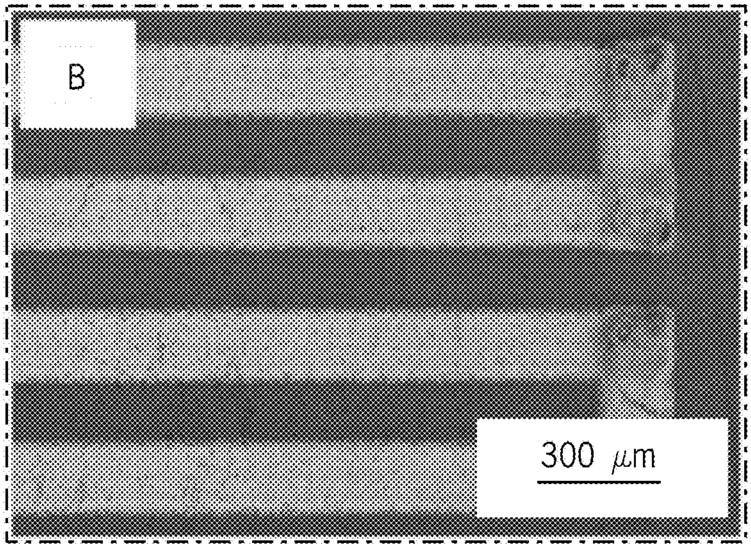
FIG. 7 is an image of one of the traces of FIG. 6 taken with an optical microcope.
Figure 8:
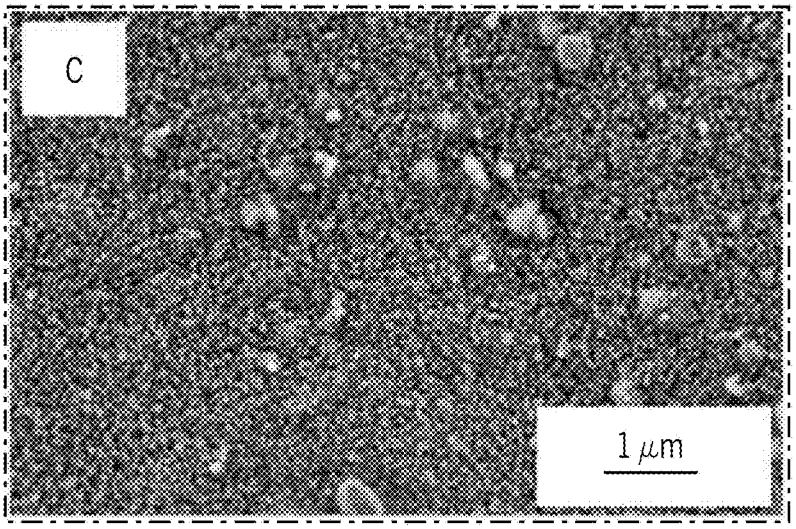
FIG. 8 is an image of one of the traces of FIG. 6 taken with a scanning electron microscope.

Using this technique, serpentine traces were printed to maximize the total resistance per unit area while keeping the total sensor area minimum to allow for temperature sensitivity. A digital photograph, optical micrograph, and an SEM image of a representative printed temperature sensor trace from the hybrid ink are shown in FIGS. 6-8, respectively. The traces are well defined, and the overspray is minimal.

Figure 9:
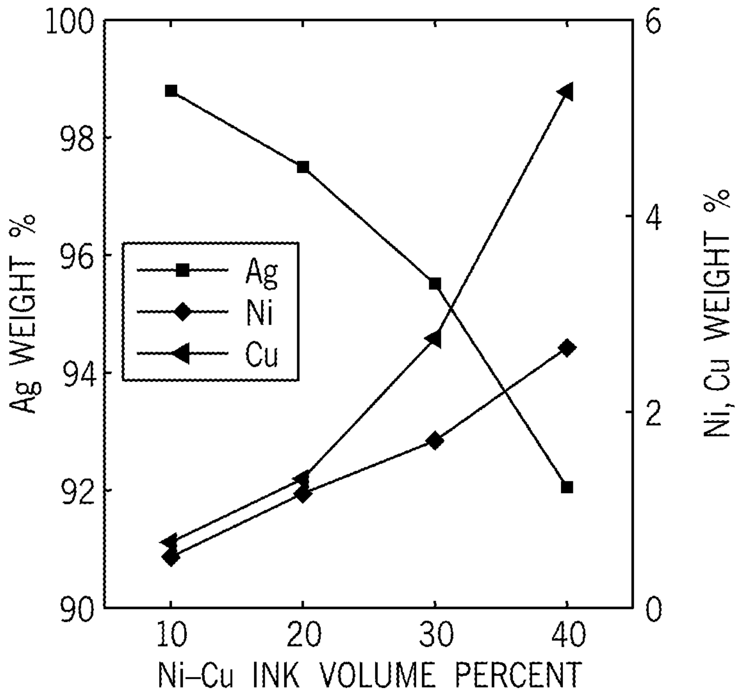
FIG. 9 is a plot showing the effect of volumetric modification of ink on the percent weight concentration of silver observed within printed thin film.
Figure 10:
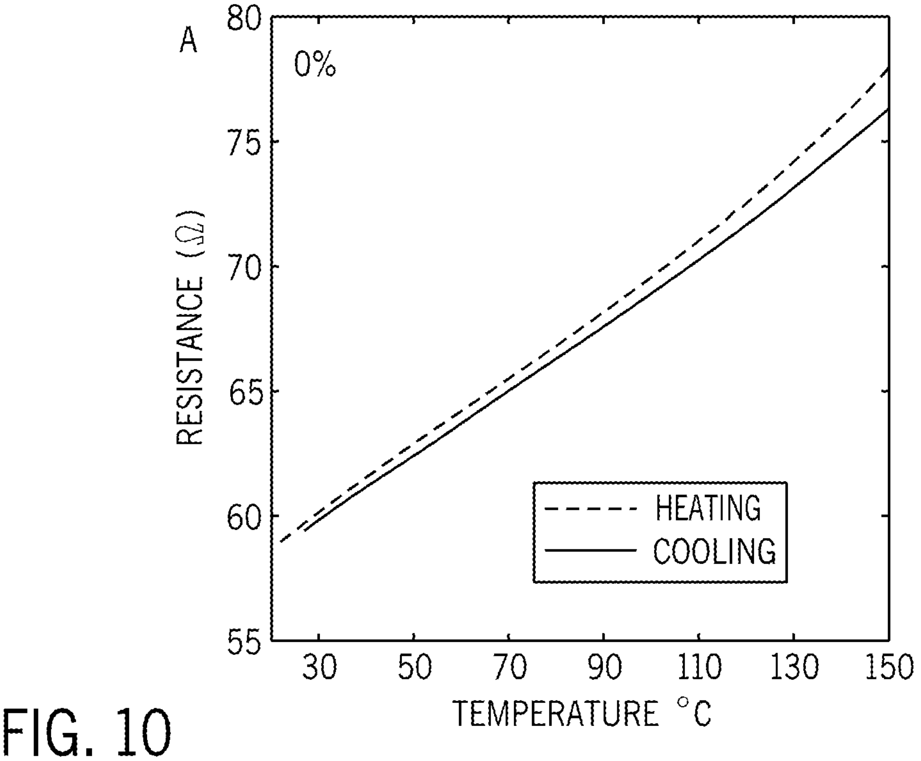
FIG. 10 is a plot of resistance temperature measurements for a trace form with an ink having a 0% volumetric percentage of Ni—Cu.
Figure 11:
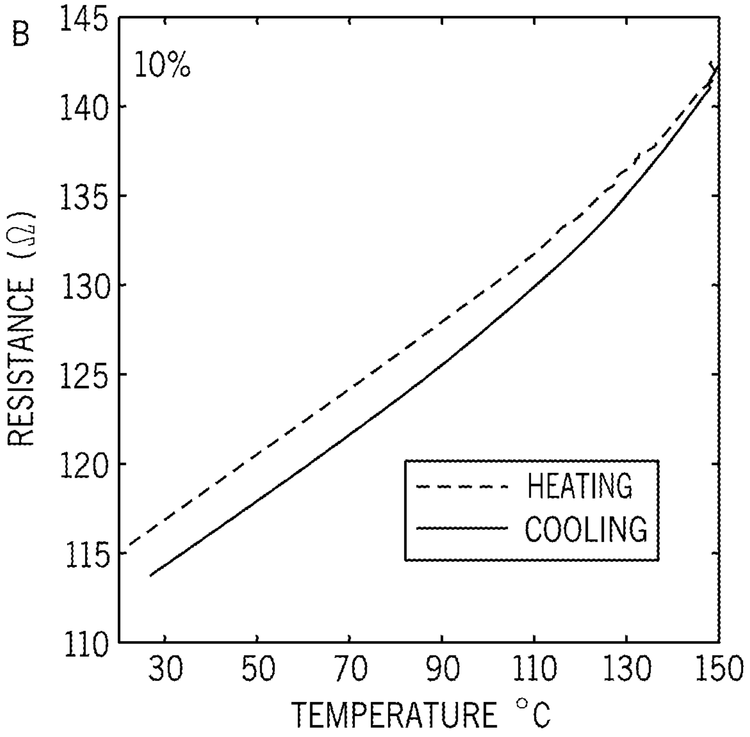
FIG. 11 is a plot of resistance temperature measurements for a trace form with an ink having a 10% volumetric percentage of Ni—Cu.
Figure 12:
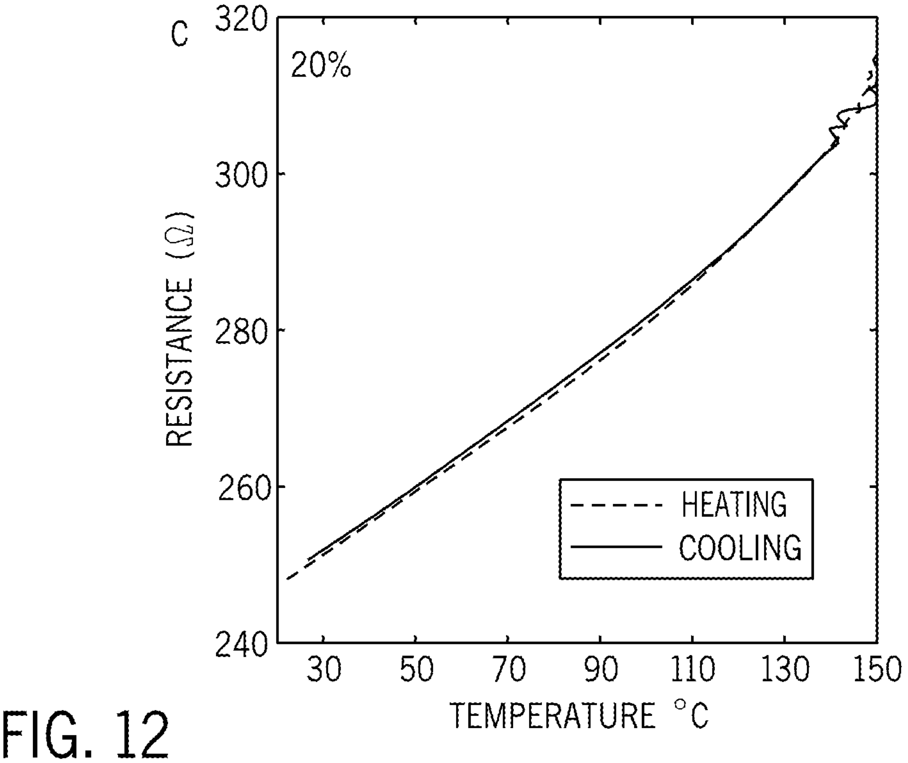
FIG. 12 is a plot of resistance temperature measurements for a trace form with an ink having a 20% volumetric percentage of Ni—Cu.
Figure 13:
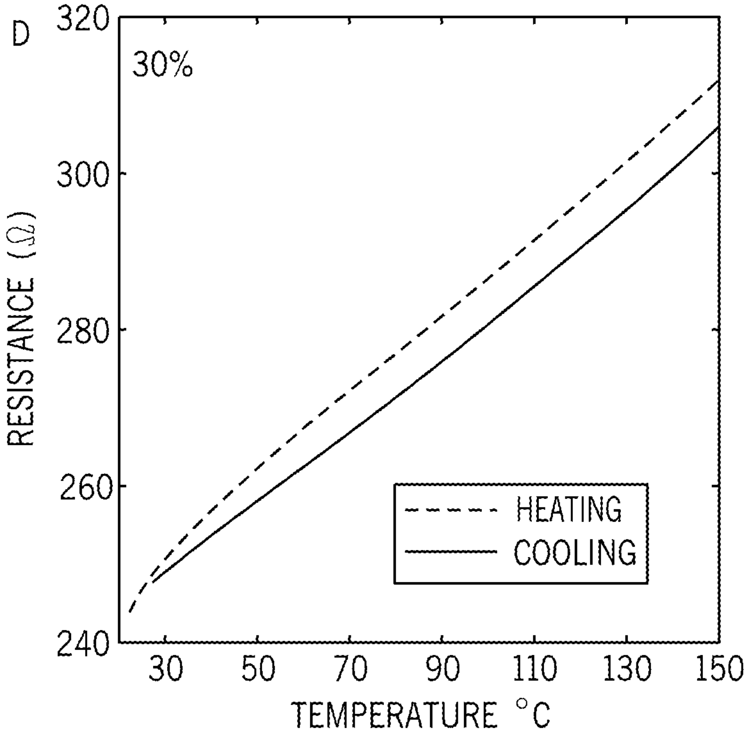
FIG. 13 is a plot of resistance temperature measurements for a trace form with an ink having a 30% volumetric percentage of Ni—Cu.
Figure 14:
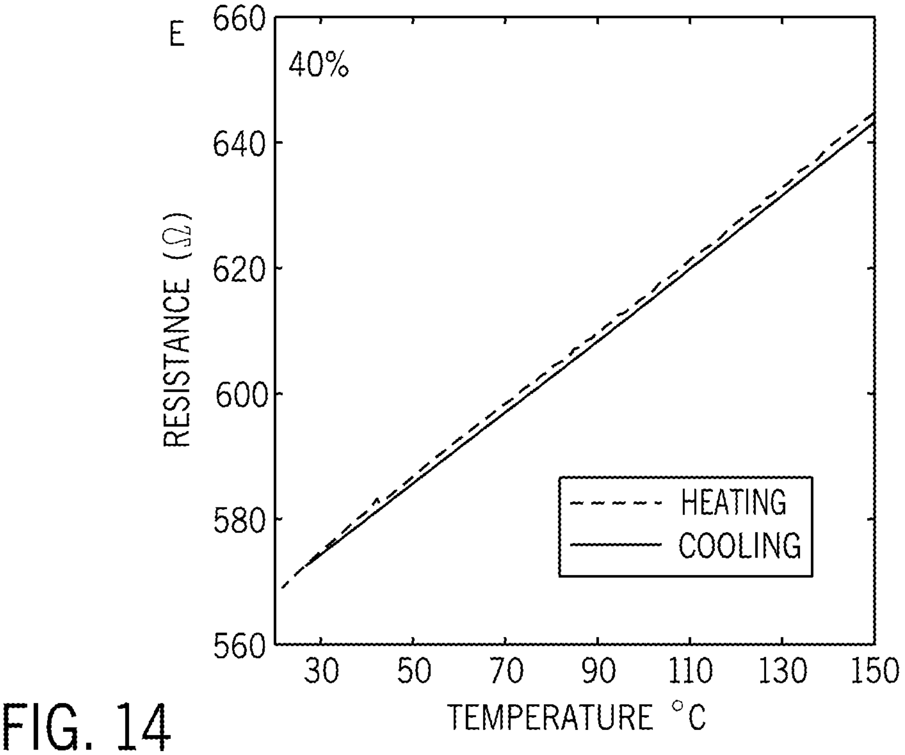
FIG. 14 is a plot of resistance temperature measurements for a trace form with an ink having a 40% volumetric percentage of Ni—Cu.

One aspect of aerosol jet printing that was considered was selective aerosolization, in which some particles may have a higher probability of being up-taken within a droplet, based on their size and overall density. To investigate the elemental composition of the hybrid ink with different Ni—Cu ink volume percent, the hybrid ink was aerosol jet printed on Kapton film and baked at 260 C for one hour, then Energy Dispersive Spectroscopy (EDS) analyses were performed, the results of which are shown in FIG. 9. As shown in FIG. 9, the Ag weight percent decreased and Ni, Cu weight percent increased with the increase of the Ni—Cu ink volume percent, which is as expected. Also FIG. 9 confirms that the Ni—Cu ink had more Cu than Ni. The EDS element mapping data is shown in FIG. 18. Also, the elemental mapping results show that the Ni, and Cu nanoparticles are uniformly distributed within the traces of the printed resistive temperature sensors, which ensures device to device performance stability of the printed sensors.

Figure 19:
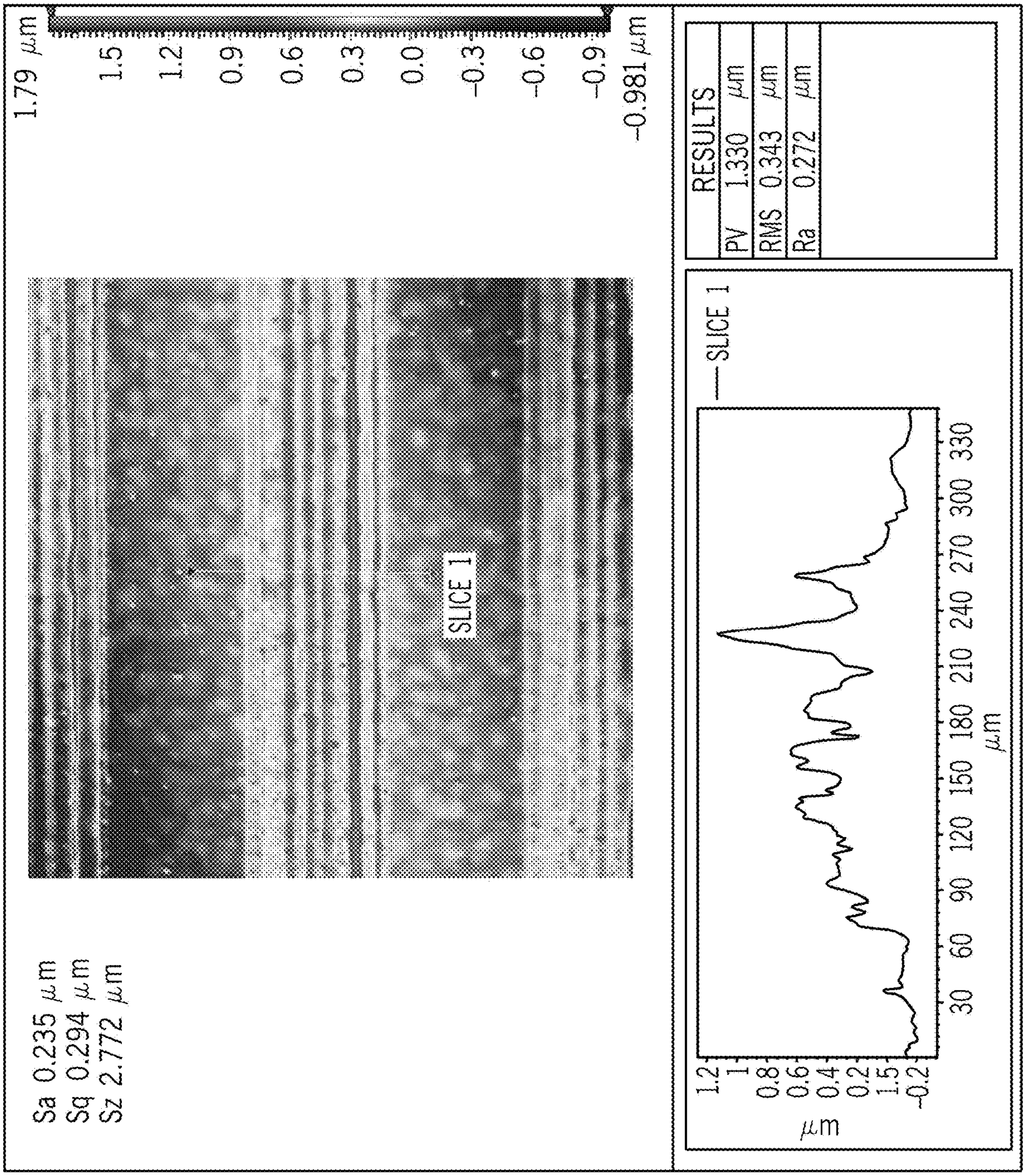
FIG. 19 is a plot showing profilometry data for an aerosol jet printed resistive temperature sensor according to aspects of the disclosure.

To investigate temperature coefficient of the resistance of the conductive traces printed with the hybrid conductive ink, resistive temperature sensors were aerosol jet printed on to Kapton® substrates in a meander line shape with dimensions shown in FIG. 5. The total trace length was 156 mm, the trace width was 200 μm, and the total sensor area was 168 $mm^2$ including connection pads. Additionally, as shown in FIG. 19, profilometry measurements suggest that the trace thickness was approximately 0.3 μm.

After printing, the sensors were baked at 260° C. for one hour. This allowed for sintering of the silver nanoparticles but did not permit the sintering of either the copper or nickel nanoparticles, ensuring that they act as defects within the thin film. Next, resistance temperature measurements over time were performed for the heating and cooling cycles as described in the experimental section and the results were shown in FIGS. 1-14. The rate of heating was uncontrolled, but on average it took 1.5 hours for the heating process and 6 hours for the cooling process. The long cooling time stems from the passive nature of the cooling procedure. Due to the slow heating/cooling, the transient response of the sensor can be ignored.

Temperature tests were performed inside a Thermo Scientific Lindberg/Blue M vacuum oven, where the printed temperature sensors were put alongside a commercial thermistor (Model number: 55004, Omega Engineering, Inc). The temperature testing was carried out in ambient atmosphere. The resistance of the printed temperature sensor and thermistor were measured with a Keysight source measurement unit (Keysight B2902, Keysight Inc.) over time. The printed resistive sensors were provided with 150 μA constant current and the thermistor were provided with 15 μA constant current to reduce self-heating related measurement errors. Data was collected by Keysight Easyexpert software. The temperature was calculated from the thermistor resistance using thermistor parameters provided by the vendor using Steinhart-Hart equation.

Figure 15:
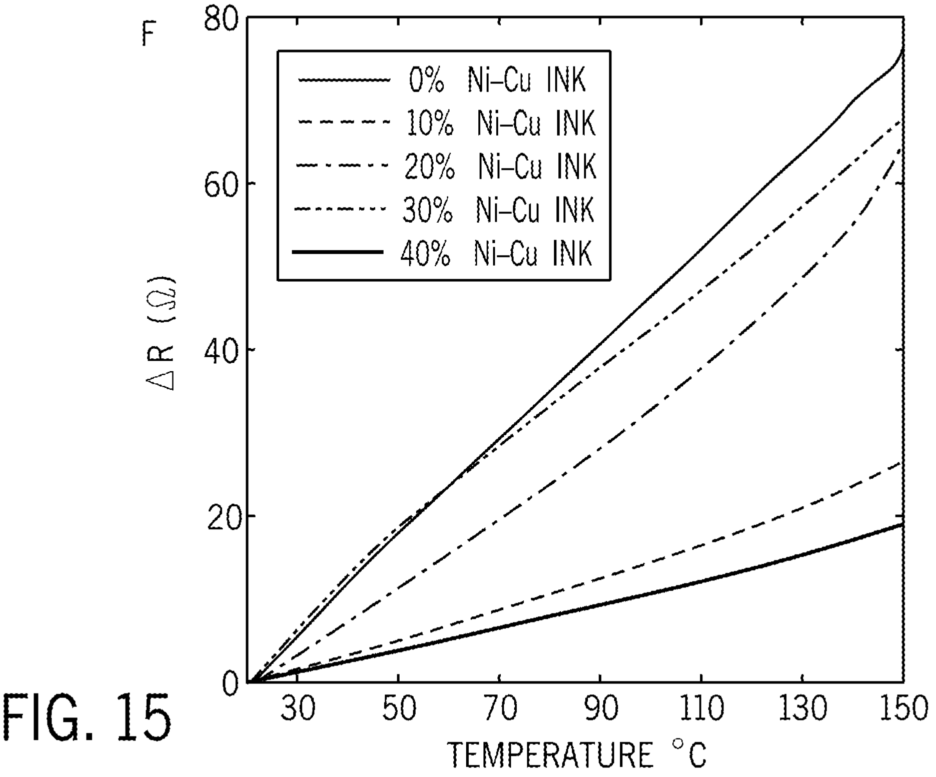
FIG. 15 is a plot comparing resistance change with respect to temperature for the inks of FIGS. 10-14.

As shown in FIGS. 10-14, the resistance for all sensors varies linearly with temperature (from 22° C. to 150° C.) for heating and cooling cycles. The primary differences between the sensors' response are the baseline resistance and the slope of the linear correlation between resistance and temperature. The baseline resistance increases with the added Ni/Cu content, and the overall slope increases as well. This is evidence of the Ni/Cu nanoparticles serving as defect sites that disrupt the percolation transport. The slope, or resistance change calculated as $\Delta R=R-R_0$, where $R_0$ is the resistance of the sensor at room temperature and R is the resistance of the sensor at 150° C., for each sensor is plotted in FIG. 15. ΔR is ultimately a function of both the TCR and the baseline resistance. This relationship is explored in the subsequent section Hysteresis for the sensors is observed. This is expected, as these sensors are not passivated, and the silver nanoparticles are sensitive to the ambient environment. Interestingly, the hysteresis is significantly reduced for the sensors with both 20% and 40% Ni Cu content. This could be an effect where the more inert nanoparticles are serving as an in-film passivation element. However, this effect is not explored in detail, and it is expected for application that the sensors would require a passivation scheme.

Continuing, the resistance of metals generally increases with temperature which is known as positive temperature coefficient behavior. However, the temperature dependency of bulk metals depends on its crystal structure and grain size. For example, the temperature dependence of resistance of nanostructured Ag depends on grain size and density. In the case of metallic thin films, the thickness of the metal films affects its TCRdue to the surface scattering of electrons, which is a known size effect. For printed metallic nanomaterial films, film density, residual organic binders, and film morphology plays important role both for film resistance and temperature coefficient of resistance.

TCR and sensitivity are the two important figure-of-merit for resistive temperature sensors. TCR is defined in Equation 1, with R being the resistance at the temperature T and $R_0$ being the resistance at the temperature $T_0$:

$$TCR = \frac{(R - R_0)}{R_0(T - T_0)} \quad \text{Equation 1}$$

TCR is dependent on atomic structure of the metal nanoparticles in the ink as well as the printed thin film properties such as film density, thickness, and width. For thin metallic film conductors, according to Matthiessen's rule, the film resistance is given in Equation 2, where $R_{defect}$ is the resistance due to the carrier scattering by impurities in conductive film and $R_{phonon}$ is the resistance due to phonon scattering:

$$R_{total} = R_{defect} + R_{phonon} \quad \text{Equation 2}$$

The Cu and Ni nanoparticles in the film act as defect points which ultimately induce carrier scattering. This scattering results in the increase of the resistance of the film at room temperature. As the volume percent of the Ni—Cu ink increases, the defect density also increases, leading to much higher initial resistance values. Also, $R_{defect}$ dominates $R_{phonon}$ as the volume percent of the Cu—Ni ink increases in the hybrid ink and the TCR decreases.

Interestingly, the TCR of the thin film does not decrease at the same rate that the baseline resistance increases. This fact implies that through the introduction of nanoparticle defects the resistance due to phonon scattering is also increased. This likely stems from an effect where the introduction of the nanoparticles modifies the percolation pathway of the constituent nanoparticle thin film, increasing the phonon scattering at the silver NP to silver NP junctions. Ultimately, the fact that the baseline resistance increases at a faster rate than the TCR decreases allows the sensitivity of the printed RTDs to be increased.

Temperature sensitivity is defined in a practical manner as the change in resistance with respect to change in temperature, shown in Equation 3:

$$\text{Sensitivity}_{temp} = \frac{(R - R_0)}{(T - T_0)} \quad \text{Equation 3}$$

The sensitivity can also be defined according to the TCR of the thin film and the baseline resistance as show in Equation 4:

$$\text{Sensitivity}_{temp} = TCR * R_0 \quad \text{Equation 4}$$

Accordingly, by increasing the baseline resistance $R_0$ at a faster rate than the TCR decreases (e.g., as can be done by hybridizing an ink) one can maximize and control sensitivity to temperature. To that end, while FIG. 17 shows that temperature sensitivity generally increases as a result of hybridization, in some cases, continued addition of Cu and Ni nanoparticles (or other secondary conductive particles) may result in a decrease in temperature sensitivity.

Figure 16:
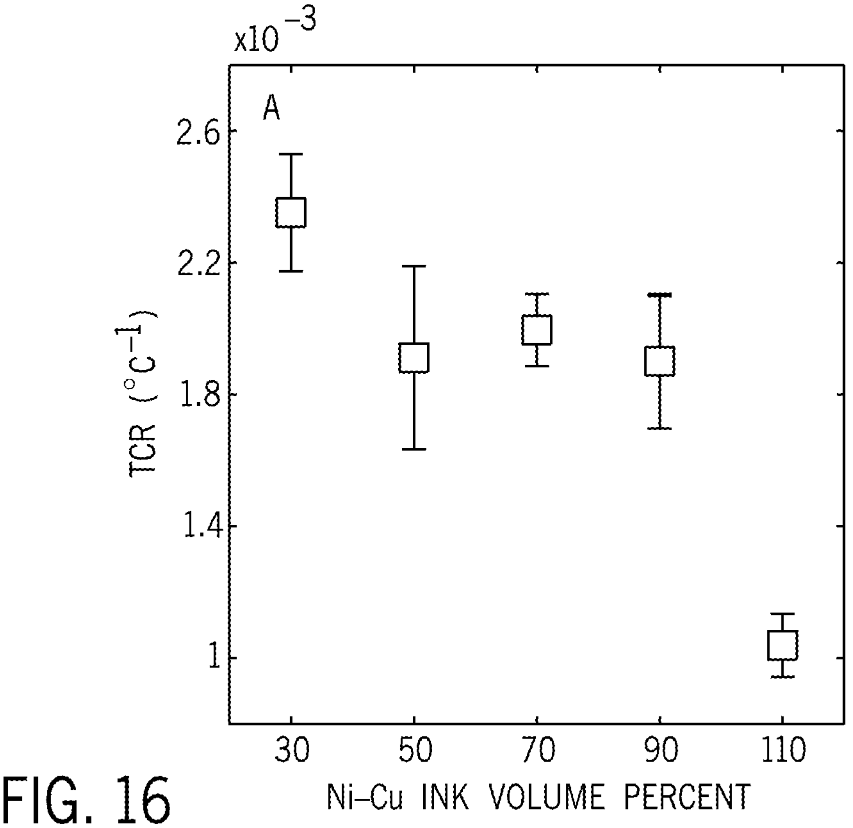
FIG. 16 is a plot showing the temperature coefficient of resistance (TCR) of the inks of FIGS. 10-14.
Figure 17:
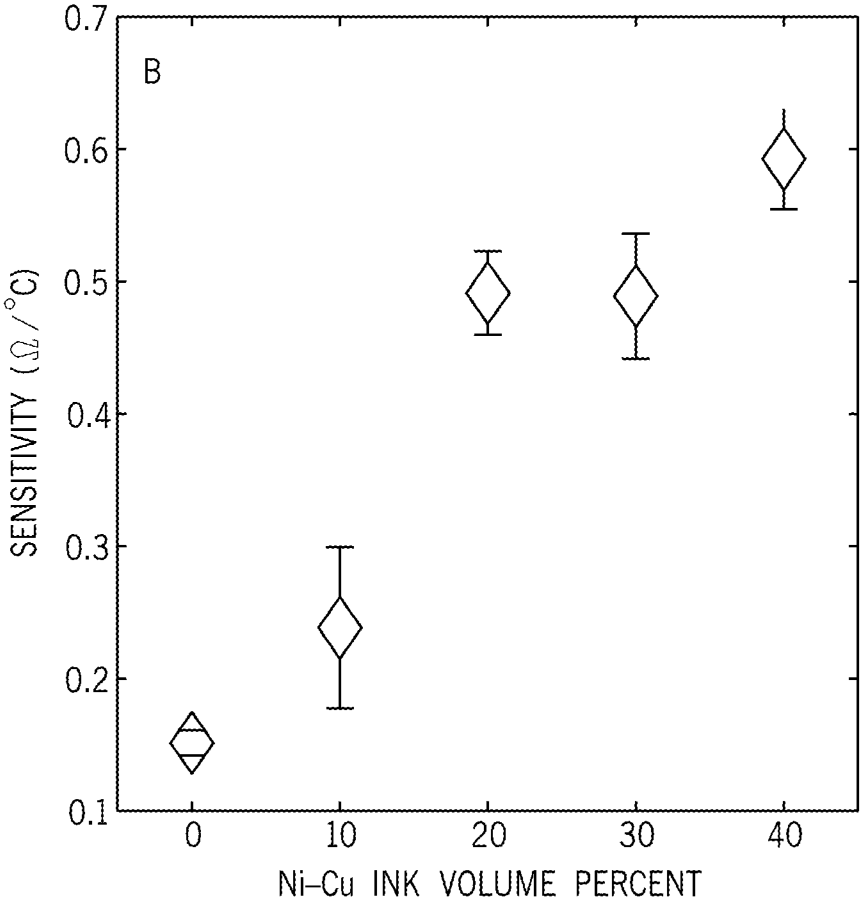
FIG. 17 is a plot showing temperature sensitivity of the inks of FIGS. 10-14.
Figure 18A:
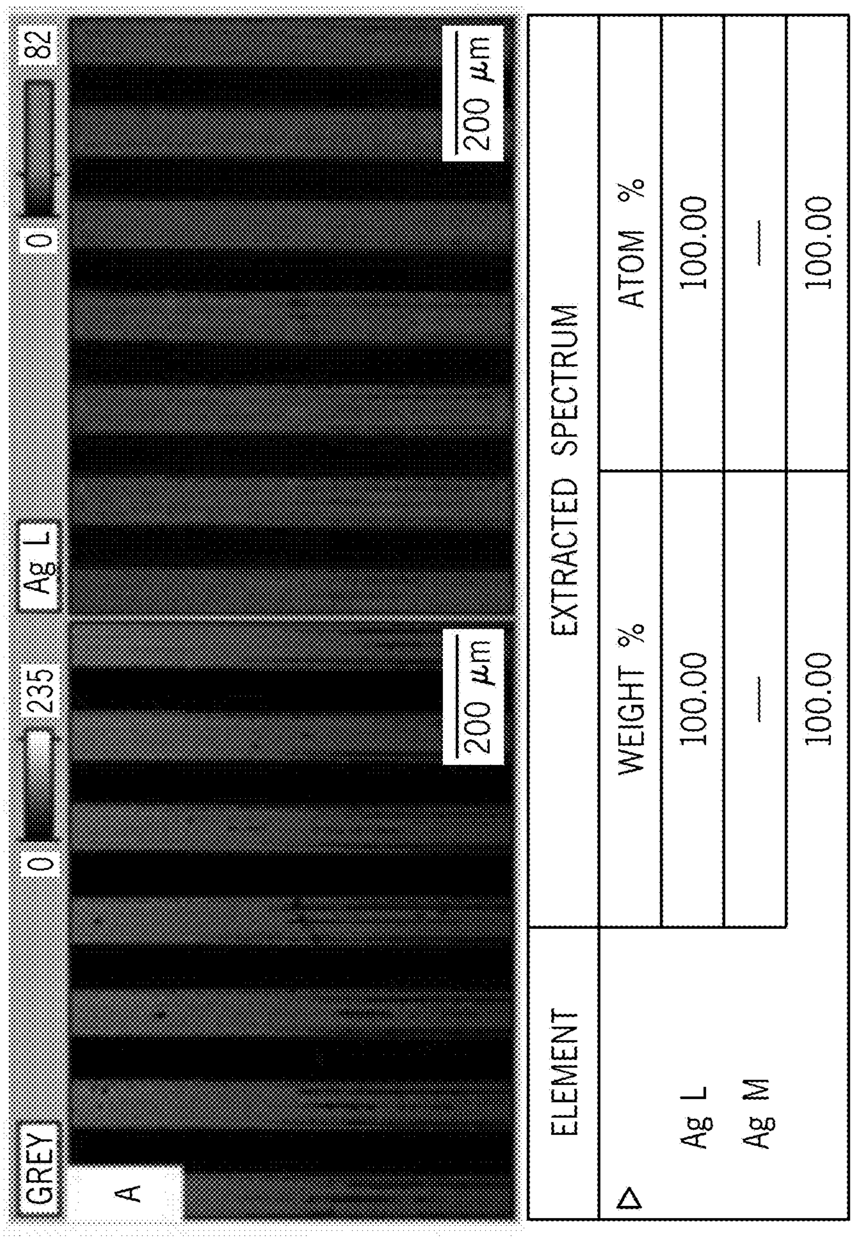
FIG. 18A is a plot showing energy dispersive spectroscopy mapping data for aerosol jet printed resistive temperature sensors with the ink of FIG. 10 wherein the ink has a 0% volumetric percentage of Ni—Cu.
Figure 18B:
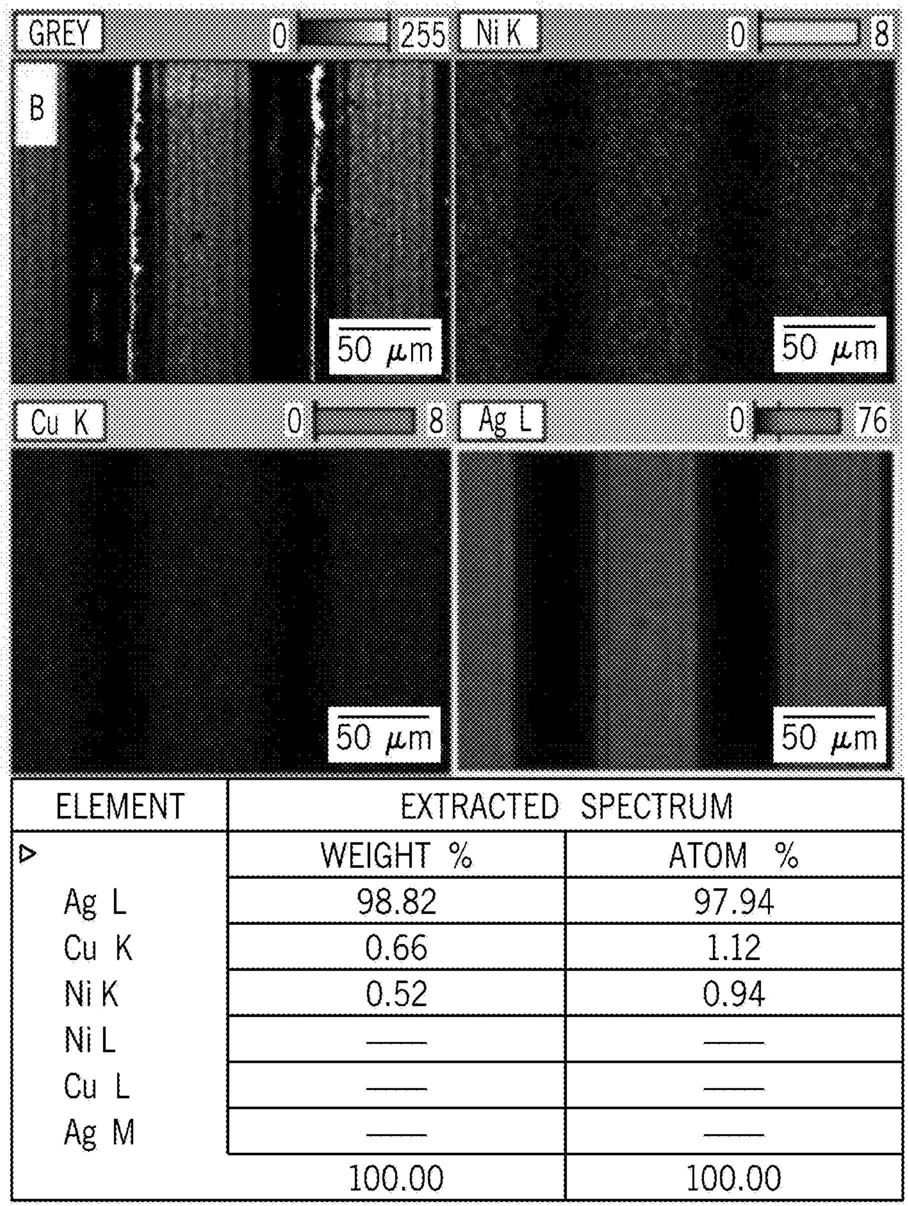
FIG. 18B is a plot showing energy dispersive spectroscopy mapping data for aerosol jet printed resistive temperature sensors with the ink of FIG. 11 wherein the ink has a 10% volumetric percentage of Ni—Cu.
Figure 18C:
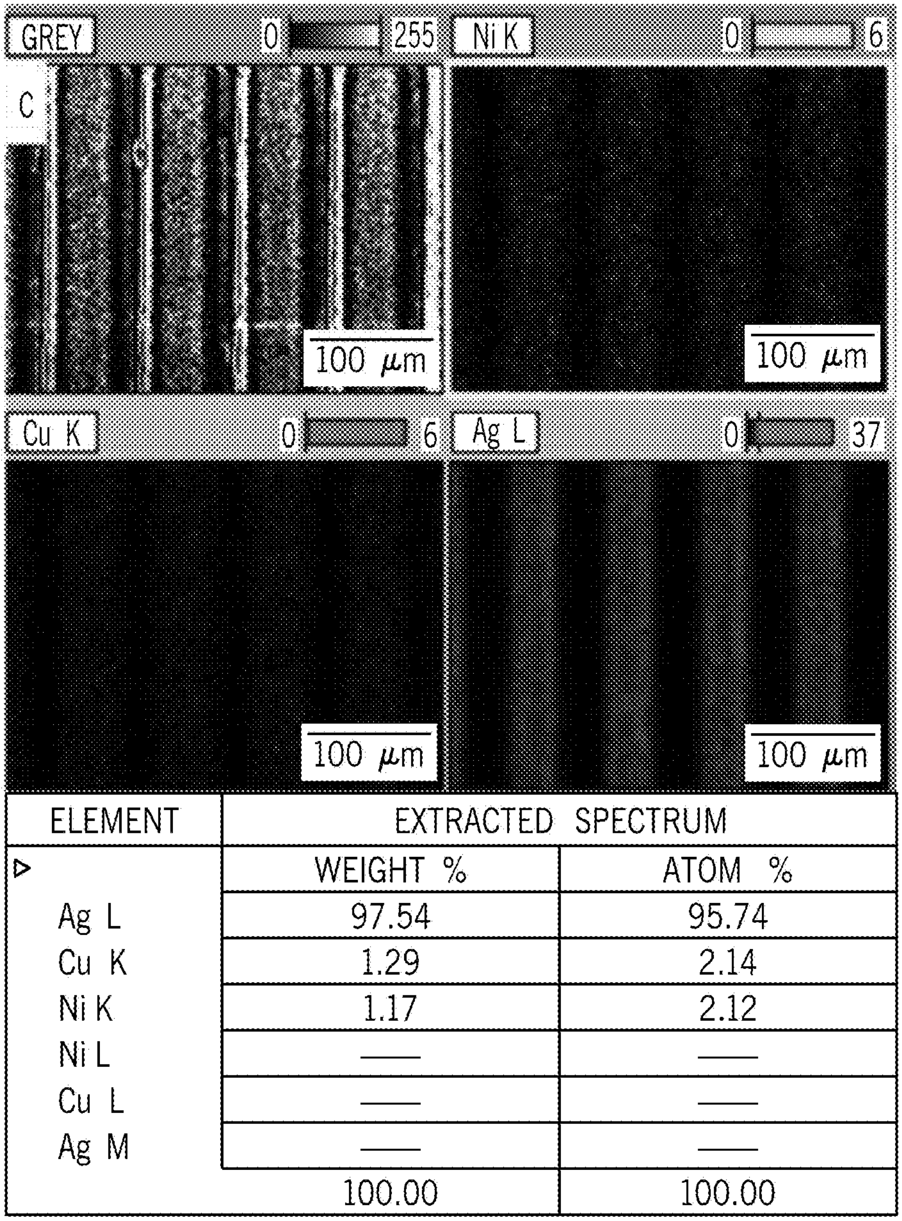
FIG. 18C is a plot showing energy dispersive spectroscopy mapping data for aerosol jet printed resistive temperature sensors with the ink of FIG. 12 wherein the ink has a 20% volumetric percentage of Ni—Cu.
Figure 18D:
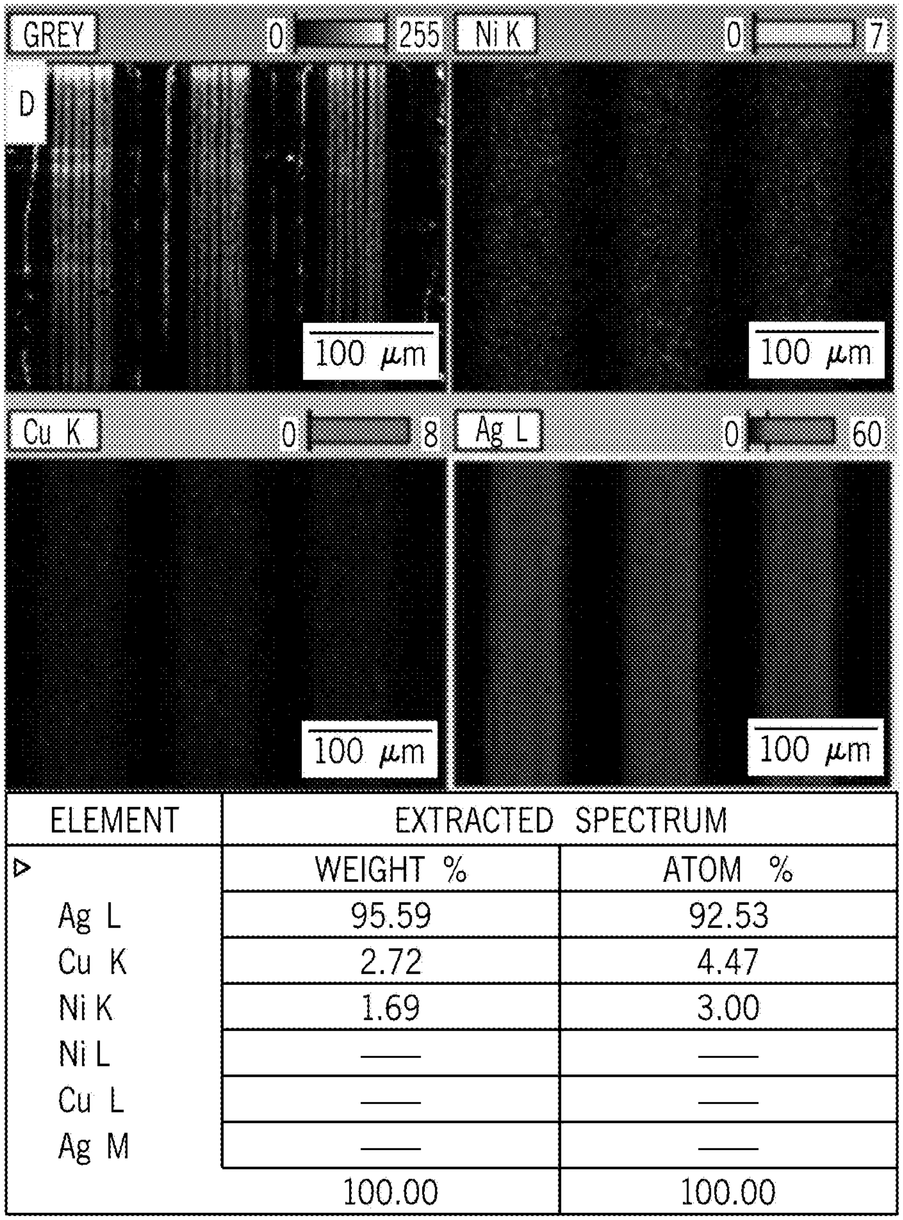
FIG. 18D is a plot showing energy dispersive spectroscopy mapping data for aerosol jet printed resistive temperature sensors with the ink of FIG. 12 wherein the ink has a 30% volumetric percentage of Ni—Cu.
Figure 18E:
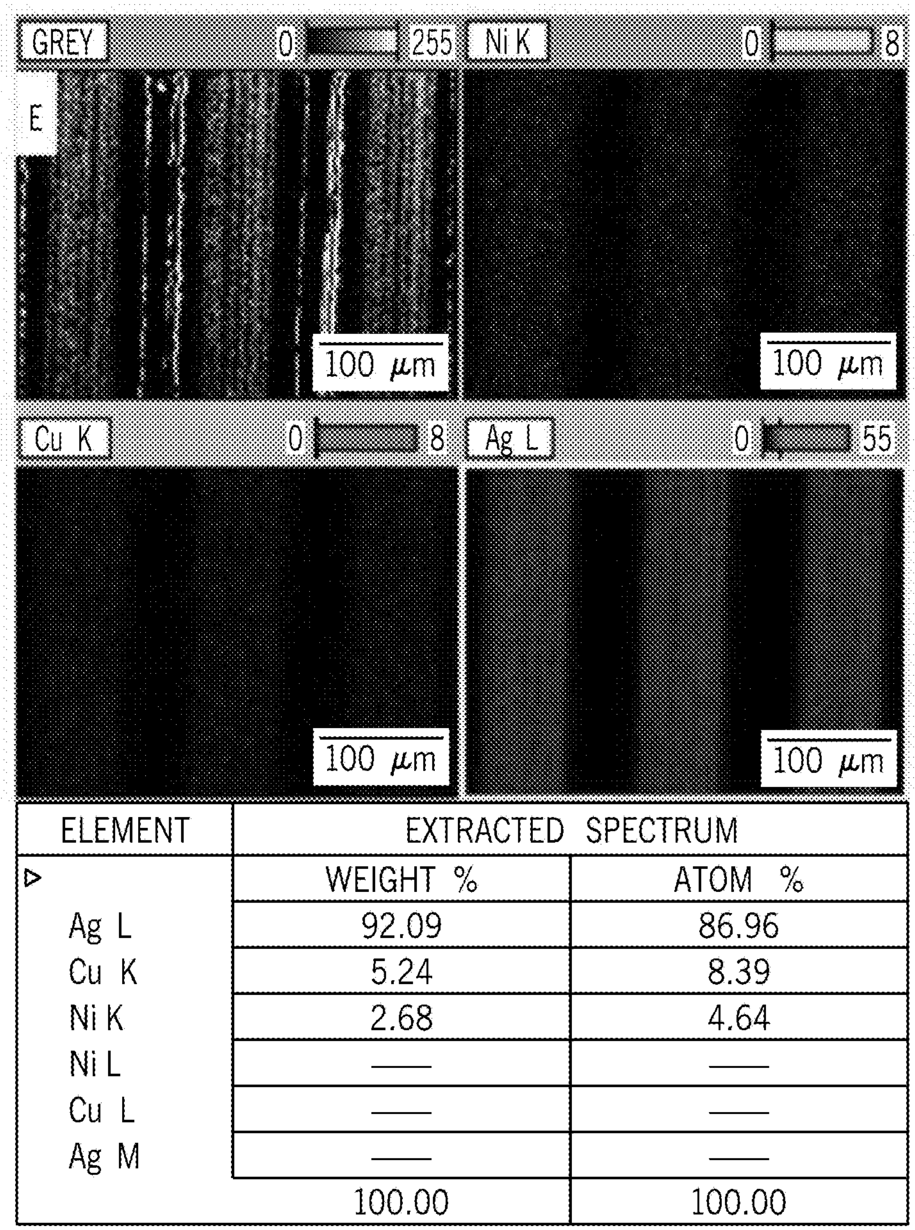
FIG. 18E is a plot showing energy dispersive spectroscopy mapping data for aerosol jet printed resistive temperature sensors with the ink of FIG. 14 wherein the ink has a 40% volumetric percentage of Ni—Cu.

The TCR and sensitivity for all sensors with different ink compositions were calculated from at least five different temperature tests for each sample and the average and the standard deviation of the results are plotted in FIGS. 16 and 17 which show: (1) TCR is maximum for the sensors printed with silver nanoparticle ink and the max $TCR=2.35\times10^{-3}\pm1.76\times10^{-4}$)(1/° C.; (2) TCR decreases with the increase of Ni—Cu ink volume in the hybrid ink; and (3) sensors printed with silver nanoparticle ink has the minimum sensitivity of 0.15±0.01 (Ω/° C.) and the sensitivity increased to 0.59±0.03 (Ω/° C.) for the sensors printed with the hybrid ink with 40% Ni—Cu nanoparticle ink. It is noted that the TCR of the sensors printed with silver nanoparticle ink is greater than expected, which is likely due to the higher sintering temperature and longer sintering time. Also, the TCR of the printed resistive sensors strongly depends on the ink composition as demonstrated above.

For printed electronics to be viable as lower cost alternatives to lithographically produced sensors, the interrogation electronics should also be low-cost. Therefore, maximizing the change in resistance effectively makes the sensors easier to measure when using lower-cost analog-to digital converters. A common method for interrogating resistance-based temperature sensors is to utilize a constant current and measure the resulting voltage. The resistance is calculated using Ohm's law and the temperature is inferred. By maximizing the change in resistance one can effectively maximize the change in voltage, ensuring the signal is affected less by voltage bias and drift, a common occurrence in lower cost interrogation electronics.

The above described experiments demonstrate that the thin FILM TCR and baseline resistance can be altered by introducing defect sites with varied metallic nanoparticles. The baseline resistance is modified more severely, which culminates in an enhancement of sensitivity. This is most evident in the trace made from a 40% volume addition of the Ni—Cu ink, where the sensitivity is increased from approximately 0.15 Ω/° C. to approximately 0.59 Ω/° C. This sensitivity increase is particularly helpful for making low-cost printed traces.

Similar principles can generally be applied to sensitivities to other variables being measured. For example, for a mechanically induced strain, the gauge factor (GF) can be defined in accordance with Equation 5 and the sensitivity can be defined in accordance with Equations 6 and 7, with R being the resistance at the current length Land $R_0$ being the initial resistance at the initial length $L_0$.

$$GF = \frac{(R - R_0)}{R_0(L - L_0)} \quad \text{Equation 5}$$

$$\text{Sensitivity}_{strain} = \frac{(R - R_0)}{(L - L_0)} \quad \text{Equation 6}$$

$$\text{Sensitivity}_{strain} = GF * R_0 \quad \text{Equation 7}$$

Various methods for tuning trace sensitivity to a particular variable of a multi-variable sensor are described above. While described individually so as to enable a clear and concise specification to be written, it is intended and will be appreciated that various embodiments may be combined or separated without parting from the invention. For example, particular spatial arrangements of a trace can be used in combination with one or more particular ink compositions to tune the trace to sense a particular variable.

The present disclosure has described one or more preferred embodiments, and it should be appreciated that many equivalents, alternatives, variations, and modifications, aside from those expressly stated, are possible and within the scope of the invention.

The invention claimed is:

1. A multi-variable sensor comprising:

a first trace extending from a first end at a first terminal to a second end at a second terminal, the first trace having a first sensitivity to a first variable of a measured system, the first and second terminals providing contacts to measure the first variable using the first trace; and a second trace extending from a third end at the second terminal to a fourth end at a third terminal, the second trace having a second sensitivity to the first variable that is less than the first sensitivity, the second and third terminals providing contacts to measure a second variable of the measured system using the second trace, the second variable being different from the first variable;

wherein:

the first trace includes a plurality of primary first trace lines connected by secondary first trace lines to form a single continuous path between the first terminal and the second terminal;

the second trace includes a plurality of primary second trace lines connected by secondary second trace lines to form a single continuous path between the second terminal and the third terminal; and the primary first trace lines are configured as a plurality of parallel trace lines extending in the first direction, and the primary second trace lines are configured as a plurality of non-linear serpentine trace lines extending in the first direction.

2. The multi-variable sensor of claim 1, wherein the first trace has a third sensitivity to the second variable and the second trace has a fourth sensitivity to the second variable, the third sensitivity being less than the fourth sensitivity.

3. The multi-variable sensor of any of claim 1, wherein the first trace is formed from a first electrically conductive ink and the second trace is formed from a second electrically conductive ink that is different from the first electrically conductive ink.

4. The multi-variable sensor of claim 3 wherein the first electrically conductive ink includes silver nanoparticles at a first percent weight concentration and the second electrically conductive ink includes silver nanoparticles at a second percent weight concentration that is greater than the first percent weight concentration.

5. The multi-variable sensor of claim 3, wherein the first electrically conductive ink includes a first concentration of organic binders and solvents, and the second electrically conductive ink includes a second concentration of organic binders and solvents that is less than the first concentration.

6. The multi-variable sensor of claim 1, wherein the first variable is mechanically-induced strain and the second variable is temperature.

7. The multi-variable sensor of claim 1 further comprising a flexible substrate that supports each of the first trace and the second trace.

8. The multi-variable sensor of claim 7, wherein the multi-variable strain sensor is a multi-variable fluid sensor, with the flexible substrate includes a flexible flap configured to extend into a fluid flow.

9. A multi-variable sensor comprising:

a first trace extending from a first end at a first terminal to a second end at a second terminal, the first trace having a first sensitivity to a first variable of a measured system, the first and second terminals providing contacts to measure the first variable using the first trace; and a second trace extending from a third end at the second terminal to a fourth end at a third terminal, the second trace having a second sensitivity to the first variable that is less than the first sensitivity, the second and third terminals providing contacts to measure a second variable of the measured system using the second trace, the second variable being different from the first variable;

wherein:

the first trace is formed from a first electrically conductive ink and the second trace is formed from a second electrically conductive ink that is different from the first electrically conductive ink; and the first electrically conductive ink includes metal particles of silver and one or more secondary conductive particles, and the second electrically conductive ink includes metal particles of silver particles without secondary conductive particles.

10. The multi-variable sensor of claim 9, wherein:

the first trace includes a plurality of a primary first trace lines connected by secondary first trace lines to form a single continuous path between the first terminal and the second terminal; and the second trace includes a plurality of a primary second trace lines connected by secondary second trace lines to form a single continuous path between the second terminal and the third terminal.

11. The multi-variable sensor of claim 10, wherein the primary first trace lines are configured as a plurality of parallel trace lines extending in the first direction, and wherein the primary second trace lines are configured as a plurality of parallel trace lines extending in a second direction perpendicular to the first direction.

12. The multi-variable sensor of claim 10, wherein the primary first trace lines are configured as a plurality of parallel trace lines extending in the first direction, and wherein the primary second trace lines are configured as a plurality of serpentine trace lines extending in the first direction.

13. A method of forming a multi-variable sensor, the method comprising:

printing a first trace onto a flexible substrate, the first trace having a first sensitivity to a first variable of a measured system; and printing a second trace onto the flexible substrate, the second trace having a second sensitivity to the first variable that is different than the first sensitivity;

wherein:

the first trace extends from a first end at a first terminal to a second end at a second terminal, the first and second terminals providing contacts to measure the first variable using the first trace;

the second trace extends from a third end at the second terminal to a fourth end at a third terminal, the second and third terminals providing contacts to measure a second variable of the measured system using the second trace;

the first trace includes a plurality of primary first trace lines connected by secondary first trace lines to form a single continuous path between the first terminal and the second terminal;

the second trace includes a plurality of primary second trace lines connected by secondary second trace lines to form a single continuous path between the second terminal and the third terminal; and the primary first trace lines are configured as a plurality of parallel trace lines extending in the first direction, and the primary second trace lines are configured as a plurality of non-linear, serpentine trace lines extending in the first direction.

14. The method of claim 13 wherein the second variable is different from the first variable.

15. The method of claim 14 comprising the additional steps of measuring a change in resistance of the first trace of the multi-variable sensor and a change in resistance of the second trace of the multi-variable sensor to determine the first variable of the measured system and the second variable of the measured system, respectively.

16. A method of measuring characteristics of a fluid flow, comprising the steps of:

providing a multi-variable sensor, the multi-variable sensor including first and second traces;

installing the multi-variable sensor to extend into a fluid flow; and measuring a change in resistance of the first trace of the multi-variable sensor and a change in resistance of the second trace of the multi-variable sensor to determine a first variable of the fluid flow and a second variable of the fluid flow, respectively;

wherein:

the first trace includes a plurality of primary first trace lines connected by secondary first trace lines to form a single continuous path between a first terminal and a second terminal;

the second trace includes a plurality of primary second trace lines connected by secondary second trace lines to form a single continuous path between the second terminal and a third terminal; and the primary first trace lines are configured as a plurality of parallel trace lines extending in the first direction, and the primary second trace lines are configured as a plurality of non-linear, serpentine trace lines extending in the first direction.

17. The method of claim 16, wherein the first variable is a flow rate of the fluid flow and the second variable is a temperature of the fluid flow.

18. The method of claim 16 comprising the additional step of supporting the first trace and the second trace on a flexible support.

19. The method of claim 18 wherein the flexible substrate includes a flexible flap configured to extend into a fluid flow.

20. The method of claim 16 comprising the additional step of fabricating the first trace from a first electrically conductive ink and the second trace from a second electrically conductive ink that is different from the first electrically conductive ink.

21. The method of claim 20 wherein the first electrically conductive ink includes silver nanoparticles at a first percent weight concentration and the second electrically conductive ink includes silver nanoparticles at a second percent weight concentration that is greater than the first percent weight concentration.

22. The method of claim 20, wherein the first electrically conductive ink includes a first concentration of organic binders and solvents, and the second electrically conductive ink includes a second concentration of organic binders and solvents that is less than the first concentration.

23. A method of measuring characteristics of a fluid flow, comprising the steps of:

providing a multi-variable sensor, the multi-variable sensor including first and second traces;

fabricating the first trace from a first electrically conductive ink and the second trace from a second electrically conductive ink that is different from the first electrically conductive ink;

installing the multi-variable sensor to extend into a fluid flow; and measuring a change in resistance of the first trace of the multi-variable sensor and a change in resistance of the second trace of the multi-variable sensor to determine a first variable of the fluid flow and a second variable of the fluid flow, respectively; and wherein the first electrically conductive ink includes metal particles of silver and one or more secondary conductive particles, and the second electrically conductive ink includes metal particles of silver particles without secondary conductive particles.

24. The method of claim 23, wherein:

the first trace includes a plurality of a primary first trace lines connected by secondary first trace lines to form a single continuous path between a first terminal and a second terminal; and the second trace includes a plurality of a primary second trace lines connected by secondary second trace lines to form a single continuous path between the second terminal and a third terminal.

* * * * *